(12) United States Patent
Simon

(10) Patent No.: US 12,293,216 B2
(45) Date of Patent: May 6, 2025

(54) PARALLEL EXECUTION OF STATEFUL BLACK BOX OPERATORS

(71) Applicant: SAP SE, Walldorf (DE)

(72) Inventor: Eric Simon, Juvisy (FR)

(73) Assignee: SAP SE, Walldorf (DE)

( * ) Notice: Subject to any disclaimer, the term of this patent is extended or adjusted under 35 U.S.C. 154(b) by 684 days.

(21) Appl. No.: 17/554,802

(22) Filed: Dec. 17, 2021

(65) Prior Publication Data

US 2023/0195510 A1 Jun. 22, 2023

(51) Int. Cl.
*G06F 9/48* (2006.01)
*G06F 9/52* (2006.01)

(52) U.S. Cl.
CPC .............. *G06F 9/4843* (2013.01); *G06F 9/52* (2013.01)

(58) Field of Classification Search
CPC .................................. G06F 9/4843; G06F 9/52
See application file for complete search history.

(56) References Cited

U.S. PATENT DOCUMENTS

| 11,803,420 B1* | 10/2023 | Kinney, Jr. ........... G06F 9/5066 |
| 2008/0301413 A1* | 12/2008 | Wang .................. G06F 9/30181 |
| | | 712/E9.016 |
| 2022/0129301 A1* | 4/2022 | Adeyenuwo .......... G06F 9/4843 |
| 2022/0129474 A1* | 4/2022 | Maduri ................. G06F 16/287 |
| 2023/0092780 A1* | 3/2023 | Begelman ............. G16H 40/20 |
| | | 382/128 |

* cited by examiner

*Primary Examiner* — April Y Blair
*Assistant Examiner* — Jonathan R Labud
(74) *Attorney, Agent, or Firm* — Buckley, Maschoff & Talwalkar LLC

(57) ABSTRACT

Some embodiments provide a system and method to receive, as an input, configuration properties of a group of operators of a data pipeline, the data pipeline including a specified multiplicity greater than one (1); generate, as an output, a configuration for two new operators, including a first new operator and a second new operator; and automatically insert the first new operator and the second new operator into a deployment of the data pipeline, the first new operator being inserted before a number of replicas of the group of operators of the data pipeline corresponding to the specified multiplicity and the second new operator being inserted after the number of replicas of the group of operators of the data pipeline corresponding to the specified multiplicity.

17 Claims, 36 Drawing Sheets

$$f(S) = F(Q_0, \rho(S))$$
$$F(Q, <>) = id_\theta$$
$$F(Q, <x>) = h(Q, x)$$
$$F(Q, S_1 \diamond S_2) = F(Q, \rho(S_1)) \; \theta \; F(\delta(Q, S_1), \rho(S_2))$$

1000

1005

RECEIVE, AS AN INPUT, CONFIGURATION PROPERTIES
OF A GROUP OF OPERATORS OF A DATA PIPELINE, THE DATA
PIPELINE INCLUDING A SPECIFIED MULTIPLICITY GREATER THAN ONE

1010

GENERATE, AS AN OUTPUT, A CONFIGURATION FOR TWO NEW
OPERATORS, INCLUDING A FIRST NEW OPERATOR AND
A SECOND NEW OPERATOR

1015

INSERT THE FIRST NEW OPERATOR AND THE SECOND
NEW OPERATOR INTO A DEPLOYMENT OF THE DATA
PIPELINE, THE FIRST NEW OPERATOR BEING INSERTED
BEFORE REPLICAS OF THE GROUP OF OPERATORS OF THE
DATA PIPELINE CORRESPONDING TO THE SPECIFIED
MULTIPLICITY AND THE SECOND NEW OPERATOR BEING
INSERTED AFTER THE REPLICAS OF THE GROUP OF
OPERATORS OF THE DATA PIPELINE

*FIG. 10*

| input type | result type | restructure configuration mappings |
|---|---|---|
| set | set of sets | *partitionByKey*({K}, S): Partition a set of tuples S so that each partition contains all elements of S that have the same values for each key of {K} |
| | set of groups | *groupByKey*({K}, S): transforms a set of tuples S into a set of groups (i.e., tuples) ((K), S') where S' is the maximal subset of elements in S that have the same key value for each key of {K}, and (K) is the representation of these key values |
| set/stream | set/stream | *sortByKey*({K}, S): Sort S according to the values of the keys in {K}. If {K} is omitted, the atomic values in (set) S are sorted according to their type |
| | | *mapByCondition*(P, S): Transforms each tuple x of a collection S into a group (b, <x>) where b is a scalar that takes the value *true* if x satisfies predicate P and values *false* otherwise. Predicate P is expressed over the attribute values of x |
| stream | stream of streams | *windowSlide*(N, m, S): Creates sliding windows of elements of S with size N and m overlapping elements with the previous window (if it exists) |
| | | *windowByKey*({K}, S): partitions a stream of tuples S so that each partition contains all elements of S with the same values for each key of {K}, and the order of elements in the partition is the same as their order in S |

*FIG. 12*

```
"divideAndConquer": {
    "portInputs": {
        "in1": {
            "portName": "in1",
            "portType": "dataset",
            "isOrdered": "true",
            "restructure": {
                "windowing": {
                    "windowSize": "10",
                    "windowOverlap": "9"
                }
            }
        }
    }
}
```

FIG. 13

```
"divideAndConquer": {
    "portInputs": {
        "in1": {
            "portName": "in1",
            "portType": "dataset",
            "isOrdered": "false",
            "restructure": {
                "grouping": [
                    {"keyName": "A"}
                ]
            }
        }
    }
}
```

*FIG. 14*

```
"divideAndConquer": {
    "portInputs": {
        "in1": {
            "portName": "in1",
            "portType": "dataset",
            "isOrdered": "true",
            "restructure": {
                "windowing": [
                    {"keyName": "A"},
                    {"keyName": "B"}
                ]
            }
        }
    }
}
```

FIG. 15

```
"divideAndConquer": {
    "portInputs": {
        "in1": {
            "portName": "in1",
            "portType": "dataset",
            "isOrdered": "true",
            "restructure": {
                "sorting": [
                    {"keyName": "A"}
                ]
            }
        }
    }
}
```

FIG. 16

| input types | binding | Binding condition |
|---|---|---|
| Streams | *bindByOrderedValue* (S, [input]) | It applies to an "iterator" stream S and a one or more state streams in [input] consisting of ordered atomic values. For an iterator element X of S, and a stream S' from [input], it returns the longest subsequence Y of S' such that: $last(Y) \le last(X)$ |
| Streams | *bindByOrderedKey* (S, [input], K) | It applies to an "iterator" stream S and one or more state streams in [input] consisting of tuple values that are ordered with respect to a key K. For an iterator element X of S, and a stream S' from [input], it returns the longest subsequence Y of S' such that: $last(Y.K) \le last(X.K)$ |
| Sets | *bindByKey* (S, [input], K) | It applies to an "iterator" set S and one or more set states in [input] consisting of tuple values having a common set of keys [K]. For an iterator element X of S, and a set S' from [input], it returns the largest subset Y of S' such that: $Y.K_i \le X.K_i$ for every $K_i$ in [K] |
| Sets | *bindCross*(S, [input]) | It applies to an "iterator" set S and one or more set states in [input] consisting of tuple values. For an iterator element X of S, and a set S' from [input], it returns S'. |

FIG. 18

```
"divideAndConquer": {
    "portInputs": {
        "in1": {
            . . . .
        }
    },
    "portOutputs": {
        "out1": {
            "portName": "out1",
            "portType": "dataset",
            "isOrdered": "true",
            "transduce": {
                "isStateless": "true",
                "iterator": "in1"
            }
        }
    }
}
```

*FIG. 19*

```
"divideAndConquer": {
    "portInputs": {
        "in1": {
            ....
        }
    },
    "portOutputs": {
        "out1": {
            "portName": "out1",
            "portType": "dataset",
            "isOrdered": "true",
            "transduce": {
                "isStateless": "false",
                "iterator": "in1",
                "bindByPrefix": {"range": "m-1"}
            }
        }
    }
}
```

*FIG. 20*

```
"divideAndConquer": {
    "portInputs": {
        "in1": {
            . . . .
        },
        "in2": {
            . . . .
        }
    },
    "portOutputs": {
        "out1": {
            "portName": "out1",
            "portType": "dataset",
            "isOrdered": "true",
            "transduce": {
                "isStateless": "false",
                "iterator": "in1",
                "bindingInputs": {
                    "binding": "bindByOrderedValue",
                    "bindingConditions": [
                        {"stateInput": "in2"}
                    ]
                }
            }
        }
    }
}
```

FIG. 21

```
"divideAndConquer": {
    "portInputs": {
        "in1": {
            ....
        }
    },
    "portOutputs": {
        "out1": {
            "portName": "out1",
            "portType": "scalar",
            "isOrdered": "false",
            "transduce": {
                "isStateless": "true",
                "iterator": "in1"
            },
            "aggregateFunction": "sum"
        }
    }
}
```

FIG. 22

```
"divideAndConquer": {
    "portInputs": {
        "in1": {
            . . . .
        },
        "in2": {
            . . . .
        }
    },
    "portOutputs": {
        "out1": {
            "portName": "out1",
            "portType": "dataset",
            "isOrdered": "false",
            "transduce": {
                "isStateless": "false",
                "iterator": "in1",
                "bindingInputs": {
                    "binding": "bindByKey",
                    "bindingConditions": [
                        {
                            "stateInput": "in2",
                            "keys": [
                                {
                                    "iteratorKey": "A",
                                    "stateInputKey": "A"
                                }
                            ]
                        }
                    ]
                }
            }
        }
    }
}
```

*FIG. 23*

| Input type | "restructure" mapping | Restructure operator configuration |
|---|---|---|
| set | *partitionByKey({K},S)* <br> *groupByKey({K},S)* | *dispatchByKey({K},S)*, which partitions a set of tuples S so that each partition contains all elements of S having the same values for each key of {K}. Each partition is sent to a replica. |
| set/stream | *sortByKey({K},S)* | *dispatchBySortedKey(M,{K},S)*, which first sorts S according to the values of the keys in {K}. If {K} is omitted, the atomic values in (set) S are sorted according to their type. The result is then partitioned in partitions of size M. Each partition is sent to a replica. |
| | *mapByCondition(P,S)* | *dispatchByChunk(M,S)*, which partitions S into sub-collections of size M and sends each partition to a replica. |
| | *windowSlide(N,m,S)* | *dispatchBySlidingWindow(M,m,S)*, where M ≥ N, returns sliding windows of elements of S with size M and m overlapping elements with the previous window (if it exists) |
| stream | *windowByKey({K},S)* | *dispatchByKeyedWindow({K},S)*, which partitions a stream of tuples S so that each partition contains all elements of S with the same values for each key of {K}, and the order of elements in the partition is the same as their order in S. Each partition is sent to a replica. |

| input types | binding | Restructure operator configuration |
|---|---|---|
| | $bindByPrefix(S, m)$ | $dispatchBySlidingWindow(M, m, S)$, where $M \geq m$ is a hyper-parameter |
| Streams | $bindByOrderedValue(S, \{input\})$ | For $S$: $dispatchByBindingChunk(M, S)$, where $M$ is an hyper-parameter, which returns an ordered collection of streams $\circ \langle P_1, \ldots, P_q \rangle$.<br>For other inputs: $dispatchByBoundedValue(L, [(n_1, r_1, v_1), \ldots, (n_q, r_q, v_q)])$, where $I$ is a stream of $input$, $n_j$ is the SSN associated with $P_j$, $r_j$ is a replica id to which $P_j$ is assigned, and $v_j = last(P_j)$. |
| | $bindByOrderedKey(S, \{input\}, K)$ | For every input $I$ (including $S$): $dispatchByKey([K], I)$, which returns an unordered collection of streams $\circ \langle P_1, \ldots, P_q \rangle$ for $q$ values of $K$ in $S$.<br>For other inputs: $dispatchByBoundedKey(L, [(r_1, k_1), \ldots, (r_q, k_q)])$, where $I$ is a stream of $input$, $r_j$ is a replica id to which $P_j$ is assigned, and $k_j$ is a value of $K$ in $S$. |
| Sets | $bindByKey(S, \{input\}, K)$ | For every input $I$ (including $S$): $dispatchByKey([K], I)$, which returns an unordered collection of sets $\circ \langle P_1, \ldots, P_q \rangle$ for $q$ values of $K$ in $S$.<br>For other inputs: $dispatchByBoundedKey(L, [(r_1, k_1), \ldots, (r_q, k_q)])$, where $I$ is a stream of $input$, $r_j$ is a replica id to which $P_j$ is assigned, and $k_j$ is a value of $K$ in $S$. |
| | $bindCross(S, \{input\})$ | For $S$: $dispatchByChunk(M, S)$, where $M$ is an hyper-parameter, which returns an unordered collection of streams $\circ \langle P_1, \ldots, P_q \rangle$.<br>For other inputs: each input is sent to each replica |

```
"divideAndConquer": {
    "portInputs": {
        "in1": {
            "portName": "in1",
            "portType": "dataset",
            "isOrdered": "false",
            "restructure": {
                "grouping": [
                    {"keyName": "A"}
                ]
            }
        }
    },
    "portOutputs": {
        "out1": {
            "portName": "out1",
            "portType": "dataset",
            "isOrdered": "false",
            "transduce": {
                "isStateless": "true",
                "iterator": "in1"
            }
        }
    }
}
```

```
"divideAndConquer": {
    "portInputs": {
        "in1": {
            "portName": "in1",
            "portType": "dataset",
            "isOrdered": "true"
        }
    },
    "portOutputs": {
        "out1": {
            "portName": "out1",
            "portType": "dataset",
            "isOrdered": "true",
            "transduce": {
                "isStateless": "false",
                "iterator": "in1",
                "bindByPrefix": {"range": "m-1"}
            }
        }
    }
}
```

FIG. 30

```
"divideAndConquer": {
    "portInputs": {
        "in1": {
            "portName": "in1",
            "portType": "dataset",
            "isOrdered": "true",
            "restructure": {
                "sortByKey": [
                    {"keyName": "A"}
                ]
            }
        }
    },
    "portOutputs": {
        "out1": {
            "portName": "out1",
            "portType": "dataset",
            "isOrdered": "true",
            "transduce": {
                "isStateless": "false",
                "iterator": "in1",
                "bindByPrefix": {"range": "m-1"}
            }
        }
    }
}
```

*FIG. 32*

```
"divideAndConquer": {
    "portInputs": {
        "in1": {
            "portName": "in1",
            "portType": "dataset",
            "isOrdered": "true"
        },
        "in2": {
            "portName": "in2",
            "portType": "dataset",
            "isOrdered": "true"
        }
    },
    "portOutputs": {
        "out1": {
            "portName": "out1",
            "portType": "dataset",
            "isOrdered": "true",
            "transduce": {
                "isStateless": "false",
                "iterator": "in1",
                "bindingInputs": {
                    "binding": "bindByOrderedValue",
                    "bindingConditions": [
                        {"stateInput": "in2"}
                    ]
                }
            }
        }
    }
}
```

*FIG. 34*

```
"divideAndConquer": {
    "portInputs": {
        "in1": {
            "portName": "in1",
            "portType": "dataset",
            "isOrdered": "false"
        },
        "in2": {
            "portName": "in2",
            "portType": "dataset",
            "isOrdered": "false"
        }
    },
    "portOutputs": {
        "out1": {
            "portName": "out1",
            "portType": "dataset",
            "isOrdered": "false",
            "transduce": {
                "isStateless": "false",
                "iterator": "in1",
                "bindingInputs": {
                    "binding": "bindByKey",
                    "bindingConditions": [
                        {
                            "stateInput": "in2",
                            "keys": [
                                {
                                    "iteratorKey": "A",
                                    "stateInputKey": "A"
                                }
                            ]
                        }
                    ]
                }
            }
        }
    }
}
```

*FIG. 36*

PARALLEL EXECUTION OF STATEFUL BLACK BOX OPERATORS

BACKGROUND

In some aspects, a context for the present disclosure is a data platform enabling the specification of applications in the form of dataflow or data pipelines and their execution in a scalable distributed architecture. In some contexts, the present disclosure applies to the processing of any large-grain dataflow using a data-driven execution model. Some of the concepts of the data pipelines considered herein are based on a flow-based programming paradigm that belongs to the class of large-grain dataflow.

However, prior (i.e., conventional) methods and systems to process data pipelines in a distributed system are typically limited in their ability to execute a group of operators in parallel by (1) replicating the code of a group on multiple processing nodes of the distributed system and (2) distributing the flow of events to the replicas of a group during the execution of the data pipeline. For example, in some prior system(s), the possibility to execute a group of operators in parallel is severely limited because too many constraints are imposed to the computation for a group of data pipeline operators.

Accordingly, it would therefore be desirable to effectuate parallel execution of a wide variety of data pipelines in an efficient and accurate manner.

BRIEF DESCRIPTION OF THE DRAWINGS

FIG. 10 is an illustrative flow diagram of a process, in accordance with some embodiments.

FIG. 12 is an illustrative example table, in accordance with some example embodiments.

FIG. 13 is an illustrative representation of yet another divide and conquer mapping, in accordance with some example embodiments.

FIG. 14 is an illustrative representation of a divide and conquer mapping, in accordance with some example embodiments.

FIG. 15 is an illustrative representation of a divide and conquer mapping, in accordance with some example embodiments.

FIG. 16 is an illustrative representation of another divide and conquer mapping, in accordance with some example embodiments.

FIG. 18 is an illustrative example table of predefined binding conditions with multiple inputs, in accordance with some example embodiments.

FIG. 19 is an illustrative representation of a divide and conquer mapping for a transduce element, in accordance with some example embodiments.

FIG. 20 is an illustrative representation of a divide and conquer mapping including a stateful transducer, in accordance with some example embodiments.

FIG. 21 is an illustrative representation of another divide and conquer mapping, in accordance with some example embodiments.

FIG. 22 is an illustrative representation of a divide and conquer mapping related to a stateless transducer, in accordance with some example embodiments.

FIG. 23 is an illustrative representation of another divide and conquer mapping, in accordance with some example embodiments.

FIG. 24 is an illustrative example table for a Restructure operator according to a restructure mapping, in accordance with some example embodiments.

FIG. 25 is an illustrative example table for a Restructure operator according to a transduce mapping, in accordance with some example embodiments.

FIG. 28 is an illustrative representation of a divide and conquer mapping, in accordance with some example embodiments.

FIG. 30 is an illustrative representation of another divide and conquer mapping, in accordance with some example embodiments.

FIG. 32 is an illustrative representation of a divide and conquer mapping, in accordance with some example embodiments.

FIG. 34 is an illustrative representation of yet another divide and conquer mapping, in accordance with some example embodiments.

FIG. 36 is an illustrative representation of a divide and conquer mapping, in accordance with some example embodiments.

Figure 1:
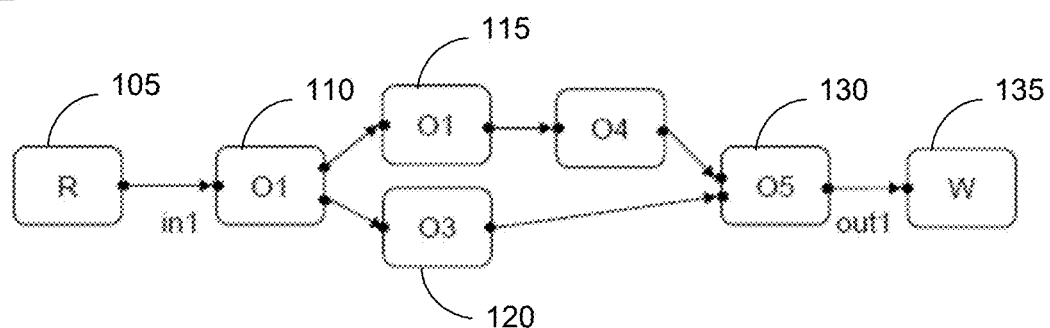
FIG. 1 illustrates a data pipeline in accordance with some embodiments.

Throughout the drawings and the detailed description, unless otherwise described, the same drawing reference numerals will be understood to refer to the same elements, features, and structures. The relative size and depiction of these elements may be exaggerated or adjusted for clarity, illustration, and convenience.

DETAILED DESCRIPTION

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, a data pipeline (also referred to as a dataflow) is a directed graph of black box components—henceforth called operators—that exchange information packets (also referred to as messages or events interchangeably) through connections relating an operator's "output port" to an operator's "input port". In some aspects, an operator represents an asynchronous process that is executed in a data-driven mode, i.e., whenever its necessary inputs are available in its input ports. In some embodiments, it is assumed that messages exchanged on a connection have a header containing metadata information and a body containing the actual data, and datasets transported via messages have a logical tabular format (called table type). Thus, each dataset exchanged on a connection has a table schema and consists of a set of records. In some aspects, there is no imposed specific granularity of messages, which may either consist of one or more records. In some embodiments herein, datasets can be bounded (i.e., have a fixed finite size), or unbounded (i.e., be infinite), and the data in a dataset can be ordered (the dataset is called a "stream") or unordered (the dataset is called a "set").

FIG. 1 shows an example of data pipeline 100 composed of multiple operators, represented by square boxes, each one having input or output ports represented by black dots, with connections represented by directed links. Operator R 105 ingests a dataset into pipeline 100 and has no input connection. Operator O 110 reads the dataset produced by operator R on its input port "in1" through a connection and outputs two datasets 115, 120 on its output ports. Operators O3 120, O4 125, and O5 125 can be described similarly. Operator W 135 reads the dataset produced by O5 130 on its output port "out1" and terminates the pipeline; it has no output connection.

Figure 2:
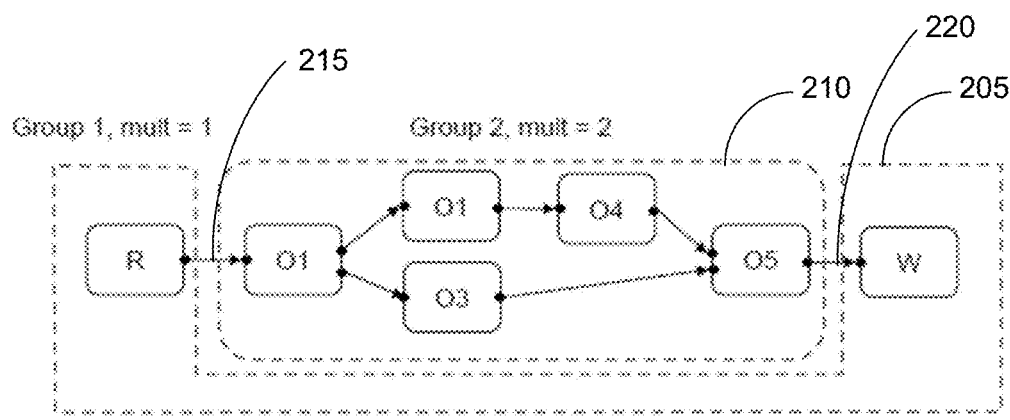
FIG. 2 is an illustrative depiction of a data pipeline with operators partitioned into groups according to some embodiments.

Before a data pipeline is deployed on a distributed system architecture, operators may be partitioned into "groups" so that each group corresponds to a specific execution environment that is used or otherwise needed by the operators in the group. The method used to decide how to group operators is orthogonal to the present disclosure. A group of operators can be configured to run with a dedicated multiplicity. That is, the group can be replicated into multiple instances, each of which running with its own execution environment. FIG. 2 shows an example of grouping for the FIG. 1 example of a data pipeline, which is denoted as pipeline 200. As illustrated, there are two groups of operators 205, 210 comprising the pipeline as represented by the dotted lines. Note that operators R and W belong to the same group, 205. In the example of FIG. 2, it is assumed that Group 1 (205) has a multiplicity of 1 while Group 2 (210) has a multiplicity of 2.

In some embodiments, for a deployed data pipeline, each operator may be translated into a process that either runs individually, or within a generic process called a sub-engine (e.g., there could be one sub-engine per predefined environment, such as a sub-engine to execute Python code, or a sub-engine to execute code written in Golang). In some embodiments, each group of operators is executed on a different processing node of the distributed system. As used herein, a node can be as general as a physical machine, a virtual machine, a processor of a machine, or an encapsulation of a set of containerized applications (e.g., a Kubernetes pod). Within a processing node, operators might communicate using local inter-process or inter-thread communication, and communications between nodes might happen through remote process communications. In some embodiments, all communications between processes may be performed using an asynchronous message passing framework that can be realized, for instance, via a publish-subscribe message distribution model, using low-level communication primitives, etc.

Figure 3:
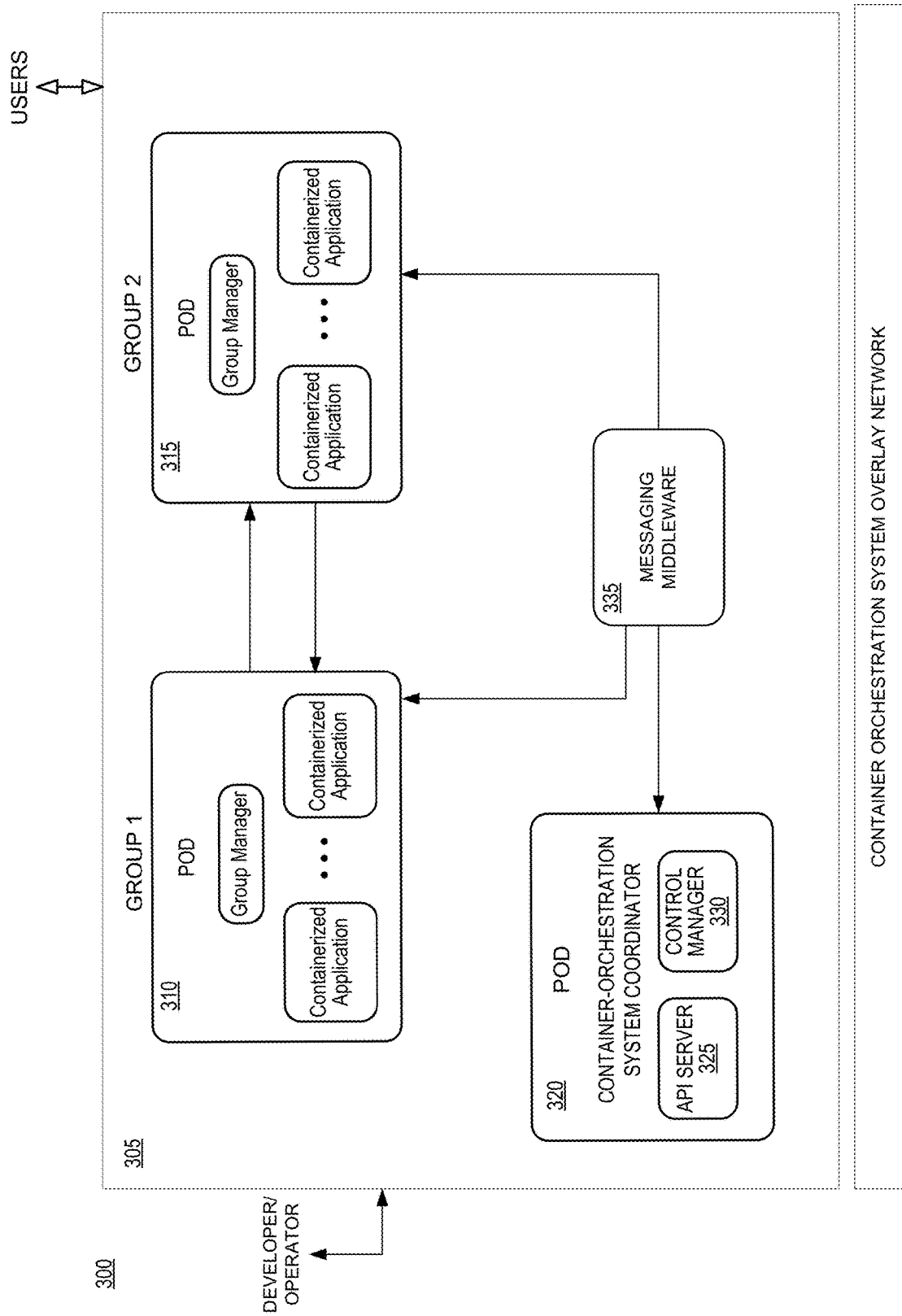
FIG. 3 is an illustrative depiction of an architecture of a system in accordance with some embodiments.

FIG. 3 is an illustrative architecture including an example of deployment of a data pipeline (e.g., the pipeline in FIG. 2) on a container orchestration system 300 including, for example, a Kubernetes runtime cluster 305 (i.e., a set of nodes grouped together), which might be an implementation provided by, for example, a data integration, management, and processing platform (e.g., SAP Data Intelligence). For example, a Docker image may be built for each group and deployed within a pod 310, 315. The deployment of the Docker image on the data processing nodes of the cluster (i.e., represented by the pods encapsulating containerized applications) is automatically managed by Kubernetes. In addition to the group pods 310 and 310, there might be a pod 320 referred to as a "coordinator" that manages the API methods for a running data pipeline, as well as the storage of a data pipeline state for rollback recovery purpose, and possibly other functions (e.g., lifecycle management controlled by control manager 330). Coordinator 320 and the group pods (310, 315) might communicate via a message passing framework or middleware 335 (e.g., NATS, an open source message-oriented middleware). Control events that change the status of the directed graph are communicated via the message passing framework. For instance, when a data pipeline (i.e., directed graph) needs to be stopped, a stop event is sent to all group pods. In the case an error causes some group pod to fail, all of the other group pods belonging to the same pipeline can be notified of this failure event.

In some aspects, inside of each group pod there is a group manager process that is responsible for managing the lifecycle of its subgraph's operators and sub-engines. For example, during the start of a graph, it establishes the connections between operators, runs the initialization methods of them, and ultimately starts them. The group manager process listens for stop events emitted by the API server 325 of coordinator 320 and publishes a stop event for the other pods (e.g., 310, 315) if one of its operators fails. The group manager may also be responsible for serializing and deserializing the messages exchanged between different groups.

In some embodiments, data is transported from operator to operator in a generic message format that can be refined by structured metadata descriptions (i.e., table type descriptions). The transport medium can be in-process queues, or other low-level communication primitives, depending on whether the message crosses sub-engine or group boundaries. In the latter case, the messages are serialized and delivered via inter-process communication when crossing sub-engines boundaries, or using an in-house messaging system, built on top of TCP (Transmission Control Protocol) when crossing groups. In the present example including the data pipeline of FIG. 2, there are two inter-group connections, including an inter-group connection 215 between operators R and 01 and an inter-group connection 220 between operators O5 and W. Each operator subscribes to a port output to receive messages and publishes messages on port outputs to which other operators can subscribe. In some embodiments, a buffer of messages might be associated with each connection.

Herein, if a group G has a multiplicity m greater than 1, then the following steps are used during deployment. In some embodiments, m replica of group G are first created, each one on a different processing node. Secondly, replicated connections are created to connect each replica of G with the predecessor and successor operators of G. At runtime, each message that is to be delivered to group G is dispatched to one of the replicas of G, and all messages output by the replicas of G are gathered and sent to the successor group of G.

Figure 4:
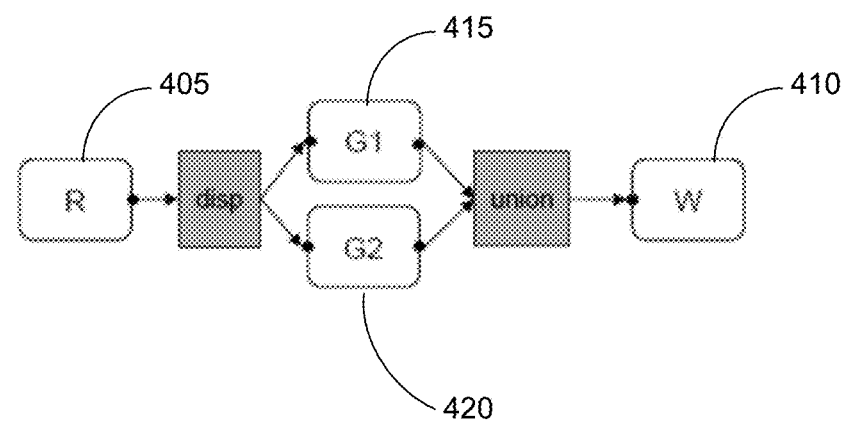
FIG. 4 illustrates a deployed data pipeline including replica of a group of operators in accordance with some embodiments.

As an example, consider the data pipeline example of FIG. 2. The subgraph encapsulated in Group 2 (210) could be represented as a single node G having a single input port "in1" and output port "out1", respectively, connected to operators R and W. Now, since the group represented by node G has a multiplicity of 2, there will be two replicas of G, denoted G1 and G2, that are created during deployment, as illustrated in the deployment of the pipeline depicted in FIG. 4. FIG. 4 depicts the operators R (405) and W (410) that run on one processing node and each replica of G (415, 420) that runs on a distinct processing node. Output elements of operator R (405) are dispatched to the replicas of G (415, 420) using, for example, a load balancing technique and output elements of G1 (415) and G2 (420) are gathered (union-ed) and passed to the next operator (e.g., W (410)).

Figure 5A:
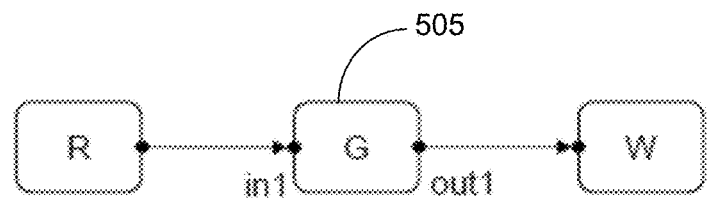
FIG. 5A is an illustrative depiction of an example data pipeline including a macro-operator, according to some embodiments.

Hereinbelow, the present disclosure might reason on groups as "macro-operators" that encapsulate a data pipeline. The input ports (resp. output ports) of the macro-operator comprise all the input ports (resp. output ports) of operators inside the group that are connected to operators outside the group. Accordingly, the example pipeline 100 of FIG. 1 can be condensed by making the subgraph associated with Group 2 (i.e., 210, in FIG. 2) a macro-operator G (505), as illustrated in FIG. 5A. Unless stated otherwise herein, no distinction is made between "operators" and "macro-operators" and may simply be referred to as operators and groups herein.

Figure 5B:
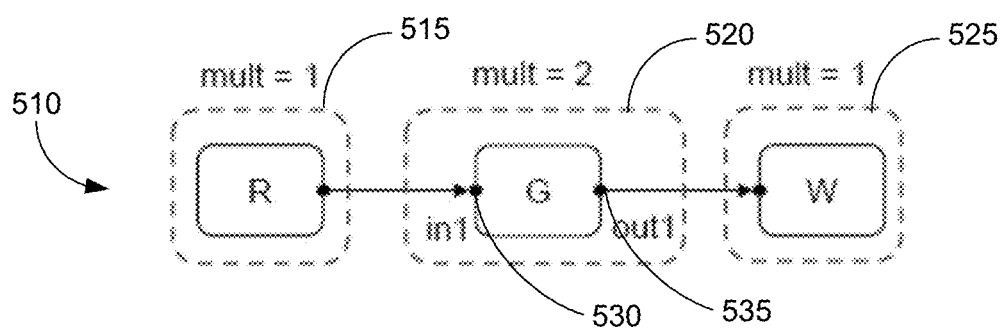
FIG. 5B is an illustrative depiction of the example data pipeline of FIG. 5A, partitioned into groups, according to some embodiments.

Regarding the discussion above to execute a group of operators G in parallel, the method (e.g., FIGS. 2 and 4) has some intrinsic limitations when the multiplicity of the group of operators G is greater than 1. To facilitate the description of these limitations, consider a simple data pipeline 510 as depicted in FIG. 5B, where three groups 515, 520, and 525 are specified with their respective multiplicity. In this example, it is assumed that a single bounded dataset is exchanged on each connection between operators, where the input port 530 and output port 535 of G are denoted by "in1" and "out1", respectively. The deployment of directed graph (i.e., data pipeline) 510 may be similar to FIG. 3, except that R 515 and W 525 will execute on different processing nodes.

In some aspects, a limitation is that group G must perform a stateless computation, which means that for each element x of the input dataset of G, zero or more output elements can be generated, but their computation solely depends on element x. Thus, G (actually, operators in G) does not store any state associated with the processing of an element received before x on its input port. Another limitation is that the input dataset of G must be unordered, which means that it is a set and not a stream.

To illustrate each one of these two limitations, we will now discuss examples of computations performed by operator G. For conciseness and a better exposure of the parallelism that is inherent to a computation (and not as a limitation), we specify the computation performed by G using a set of recursive definitions.

First, suppose that operator G performs a "stream mapping", named "2add", over an input bounded stream S, as defined by the equations below in which [x] denotes a stream of one element, [ ] denotes the empty stream, "." is a stream constructor, and "*" is an append ("cons") operator. Mapping 2add adds the value "2" to each element x of the input stream, and importantly, it outputs its result elements in the same order as they appear in S.

The first equation immediately below specifies that the output of an empty stream is an empty stream. The second equation means that the output of a stream composed of a single element x is a stream in which the value "2" has been added to x. The third equation means that the output of a stream is obtained by appending the result of the computation of the "head" (first element) of the stream to the result of the computation of the "tail" of the stream. This last equation is recursive and exits when the only element left in the "tail" is a stream with a single element or an empty stream.

$$2\text{add}([\ ])=[\ ]$$

$$2\text{add}([x])=[x+2]$$

$$2\text{add}(x \cdot S)=2\text{add}(x)*2\text{add}(S)$$

Although this computation is inherently parallel (e.g., it is referred to as "pipeline parallelism"), if the elements of input S are dispatched to the replicas G1 and G2, there is no guarantee, in a distributed system that two output elements 2add ($x_1$) and 2add ($x_2$), of G1 and G2 respectively, will be gathered and passed to operator W in the same order as elements $x_1$ and $x_2$ appeared in S. That is, the computation may not "preserve the order" of S.

Furthermore, suppose that operator G performs a "stream transduction", named "diffs", over an input bounded stream S, as defined by the equations immediately below that computes a stream of differences between adjacent elements in the input. The first equation initializes the computation with a state equal to an empty stream [ ]. Then, function "diffs1" iterates over the input S while incrementally transforming the state Q. In the third equation, the difference between the current element x and the value of the unit stream Q, is appended to the result.

$$diffs(S)=diffs1([\ ],S)$$

$$diffs1(Q,[\ ])=[\ ]$$

$$diffs1(Q,x\cdot S)=if(Q=[\ ],[\ ],[x-unitValue(Q)])*diffs1([x],S)$$

The computation immediately above is another example of pipeline parallelism. However, if the elements of input S are dispatched to the replicas G1 and G2 using, for instance, a round-robin strategy, the result computed by one of the replicas for an element x of S will be wrong because the replica misses the value of the element preceding x in S to compute a proper difference value. Indeed, the dispatching method must be conscious of the state needed by a replica to compute the correct value for an element of S.

Additionally, suppose that the input S is a bounded set and operator G computes an aggregate, named "count", that counts the number of elements in S. The result output by G is therefore a single integer value. The aggregate computation is described by the equations immediately below in which { } denotes the empty set, {x} is a set composed of a single element, and ∪ is the standard union operator (without duplicate elimination) between sets. The third equation specifies that the count of elements in a set is obtained by adding the count of elements in each one of the two partitions of that set. This is a recursive definition that exits when the only element left in each partition is a singleton set or an empty set.

$$count(\{\ \})=0$$

$$count(\{x\})=1$$

$$count(S_1 \cup S_2)=count(S_1)+count(S_2)$$

Again, this computation is intrinsically parallel (e.g., referred to as "independent parallelism"). However, if the elements of input S are dispatched to the replicas G1 and G2, we will get two integer values, each one representing the number of elements processed respectively by G1 and G2. This is not the expected result (i.e., the single integer value introduced above).

These limitations of previous (and other) method(s) discussed above for executing a group of operators in parallel prevents both the parallel execution of costly stateful operators and the application of parallelism to streaming data, that may encompass a multitude and significant variety of use cases of data pipelines.

The above method(s) have been previously used by a number of different systems, including for example, serverless frameworks where each group would correspond to a serverless function. In such implementations, an automatic scale up and scale down mechanism is provided to decide how many replicas of a function F must be created. When multiple replicas exist, the messages targeted to the function F are automatically dispatched to its replicas and the results of the replicas are then consumed by the next function that subscribed to the type of events produced by F. Thus, serverless frameworks inherit the same limitations discussed above, including the functions must be stateless computations and the datasets consist of unordered data.

Distributed streaming systems (e.g., Spark, Flink, Google dataflow, etc.) might provide a solution to enable the scalable execution of a data pipeline. Such systems assume that the data pipeline is written as a monolithic application, using some common programming language and a specific API provided by the pipeline engine. Before execution, the code of the data pipeline application is parsed by the pipeline engine and a graph of connected components is created. Then, depending on their properties, some of the components can be replicated. For instance, Spark creates a graph composed of stages and each stage can be replicated. Communication between stages that have been replicated may require some "shuffling" (i.e., re-partitioning) process to dispatch the events produced by the replicas of a stage to the next stage in the graph. Initially, input datasets are partitioned (e.g., in the form of Resilient Distributed Datasets) and each partition is sent to a replicated stage. These methods enable the parallel processing of operators like aggregates (e.g., the function "count" discussed above), group-by, and joins, because the shuffling process is performed in accordance with the API method used by the operator to specify its data transformation. However, this methodology has two disadvantages. One, it does not work for pipelines of black box components since the code of the operations must be parsed and analyzed to decide how a graph of components should be created and how shuffling must be configured. Two, when a dataset containing ordered data is processed in parallel by different replica, the result does not necessarily preserve the ordering of data in the input.

Given a data pipeline that contains a group of black box operators G, which implements a stateful computation over ordered or unordered data, the present disclosure provides a method and system to, in some embodiments, (1) specify the inherent parallelism of the computation done by G, and (2) use that specification to generate a deployment of the data pipeline in which group G can be executed in parallel.

More specifically, the present disclosure relies on a precise characterization of an inherently parallel computation, referred to herein as a "divide-and-conquer" mapping. Given a data pipeline in which a group of operators G can be specified as a divide-and-conquer mapping, a method herein may deploy that data pipeline with the guarantee that the parallel execution of G is correct. That is, the data pipeline will return the same result as its execution without any parallelism (i.e., without any replication of group G).

One or more principles and aspects of the novel methods and system disclosed herein may be discussed, in illustrative example(s), using the example data pipeline FIG. 5B. However, the data pipeline of FIG. 5B is used for illustrative purposes, not as an indication of any limits of the methods and systems disclosed herein.

As used herein, we define generic configuration properties (i.e., metadata), referred to as "divide-and-conquer properties", that can be associated with a group G to describe the fundamental properties of an inherently parallel computation implemented by that group. These divide-and-conquer properties specify three characteristics of divide-and-conquer mappings: (1) the restructuring of an input dataset into another dataset, (2) the transduction of a (possibly restructured) input dataset with respect to an incremental state, and (3) the aggregation of the results obtained for each element of the input dataset. The characteristics (1) and (2) correspond to the "divide" part of the mapping, while characteristic (3) corresponds to the "conquer" part of the mapping. Some embodiments also provide a predefined list of values for these configuration properties that is sufficient to describe a (large) class of "divide-and-conquer" mappings.

The present disclosure provides an algorithm that takes, as input, the configuration properties of group G for which a multiplicity m greater than 1 has been specified and generates, as output, a configuration for two new operators called "Restructure" and "Collect". The Restructure and Collect operators are automatically inserted in the deployed data pipeline before and after, respectively, the m replicas of G.

Figure 6:
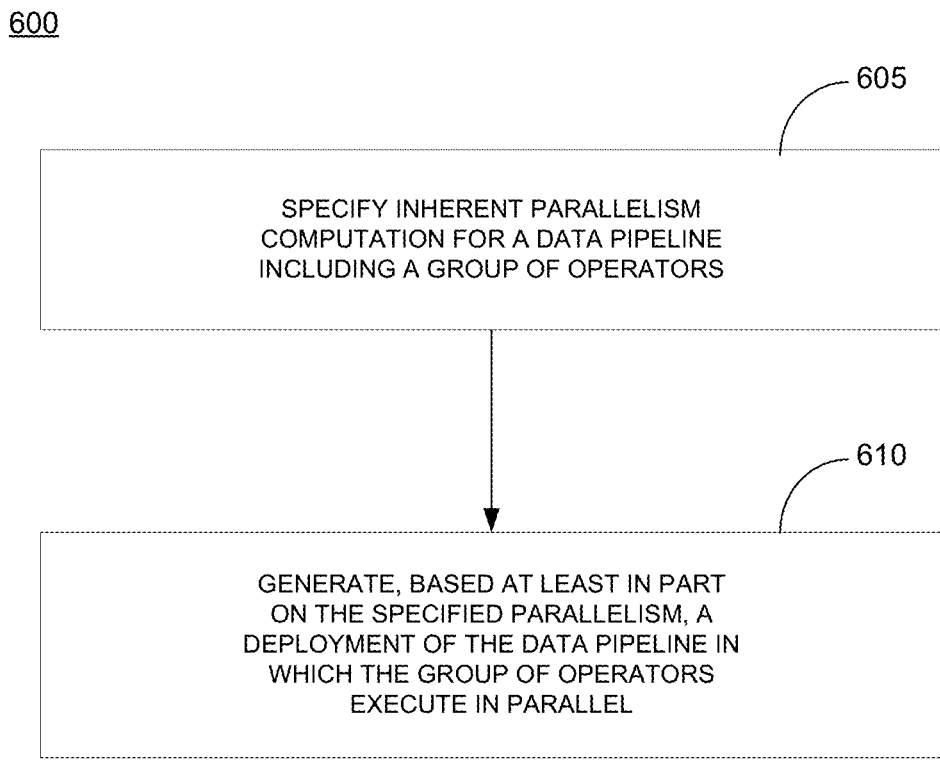
FIG. 6 is an illustrative high-level flow diagram of a process, in accordance with some embodiments.

FIG. 6 is an illustrative high-level flow diagram of a process, in accordance with some embodiments. In some aspects process 600 is a general overview of a method to process a data pipeline including a group or groups of black box operators, G. The data pipeline including the operators G provide a stateful computation that can handle, for example, ordered and unordered data. Process 600 is an introduction to features of the processes of present disclosure. Examples and details related to and fully describing various aspects of the operations of process 600 are discussed hereinbelow. Briefly, operation 605 specifies the inherent parallelism of computation for a data pipeline comprising a group of operators. Operation 610 generates, based at least in part on the specification of operation 605, a deployment of the data pipeline in which the group of operators execute in parallel. Furthermore, an execution of the deployed pipeline is applicable to a wide variety of datasets, as discussed throughout the following disclosure.

Figures 7, 8:
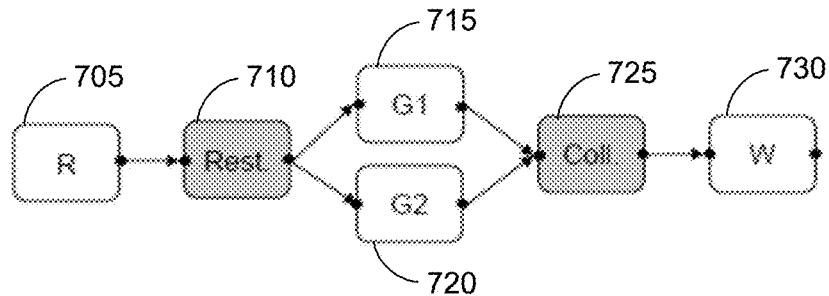
FIG. 7 is an illustrative depiction of a deployment of a data pipeline, including replicas configured for parallel execution of the data pipeline, according to some embodiments.
FIG. 8 is an illustrative listing of equations representing a divide and conquer mapping, according to some embodiments.

FIG. 7 depicts an illustrative example of a "divide-and-conquer" mapping applied to the data pipeline of FIG. 5B, in accordance with some embodiments. As shown, output elements of R 705 are "restructured" by Restructure operator 710 according to the configuration properties of G and dispatched to the replicas of G (i.e., G1 715 and G2 720). Also, the results of G1 and G2 are "collected" by the Collect operator 725 according to the properties of G and the order preserving requirement and provided as input elements to operator W 730. That is, using the divide and conquer method herein, the data pipeline of FIG. 5B is deployed as shown in FIG. 7, where "Rest" and "Coll" respectively represent the Restructure and Collect operators that are inserted before and after the replicas of G, respectively.

When the deployed graph 700 executes, the Restructure operator 710 transforms the input dataset processed by G into a new (i.e., "restructured") dataset whose elements are dispatched to the replicas 715, 720 of G. The Collect operator 725 gathers the results produced by the replicas 715, 720 of G and computes a result that is passed to the successors of G in the data pipeline, which in the example of FIGS. 5B and 7 is operator W 730. In some aspects, the divide and conquer method disclosed herein operates to guarantee that the result of the deployed data pipeline is the same as the result obtained using a deployed data pipeline in which no group is replicated (i.e., all groups have a multiplicity of 1).

We now formally characterize computations that are inherently parallel as "divide-and-conquer" mappings. These divide-and-conquer mappings are defined over data values that can be atomic or constructed, with the latter representing complex structures (e.g., nested values) that can be either tuples or collections. Herein, tuples refer to typically heterogeneous structures with a small number of elements, while collections refer to typically homogeneous structures with a large number of elements.

As used herein, values are defined recursively as follows: any scalar is a value, any finite tuple $(v_1, \ldots, v_n)$ of values $v_1, \ldots, v_n$ is a value, and any collection of values is a value. Within a tuple, a value can be identified by its $i^{th}$ position or a unique name $A_i$ called an attribute name. For an attribute name, a tuple value v is noted $(A_1:v_1, \ldots, A_n:v_n)$ and the attribute value $v_i$ of tuple v is noted $x.A_i$. Collections herein are recursively defined as follows: $<>$ is the empty collection, $<v>$ is a unit collection, and $S_1 \diamond S_2$ is a collection if $S_1$ and $S_2$ are two non-empty collections. Ordered or unordered collections can be modeled. For instance, an ordered stream [1, 2, 3, 4] can be modeled as: $1 \diamond (2 \diamond (3 \diamond 4)))$ while an unordered set will be modeled as: $(1 \diamond 2) \diamond (3 \diamond 4)$, and a collection: $<(0, <a> \diamond \diamond <b>)> \diamond <(2, <c> \diamond <e>)>$ models a set of two tuples, each of which representing a group possessing an atomic value and a set. Herein, the terms stream or set are used to indicate whether a dataset is ordered or not.

Using the value model described above, a divide-and-conquer mapping may be represented as having the following general form depicted in FIG. 8. In the equations of FIG. 8, symbols have the following meaning:
ρ: is a mapping that restructures input S (e.g., sorting, partitioning);
h: computes an output with element x in state Q;
θ: is a binary collect operator with identity $id_\theta$
$Q_0$: is an arbitrary initial state; and
δ: state transition mapping.

As used herein, a group of operators in a data pipeline is inherently parallel if its computation can be described by a divide-and-conquer mapping. In this definition, a group of operators implicitly has a single output, consisting of a collection or an atomic value, that is computed from a single input collection S.

Following, the definition is generalized for an output computed from multiple inputs. It is assumed that a general divide and conquer mapping f can be translated into a composition of basic mappings, as displayed in FIG. 9, when $\delta(Q, S)=\delta'(Q, \rho(S))$ for some mapping $\delta'$. The present disclosure uses this assumption hereafter.

Figure 9:
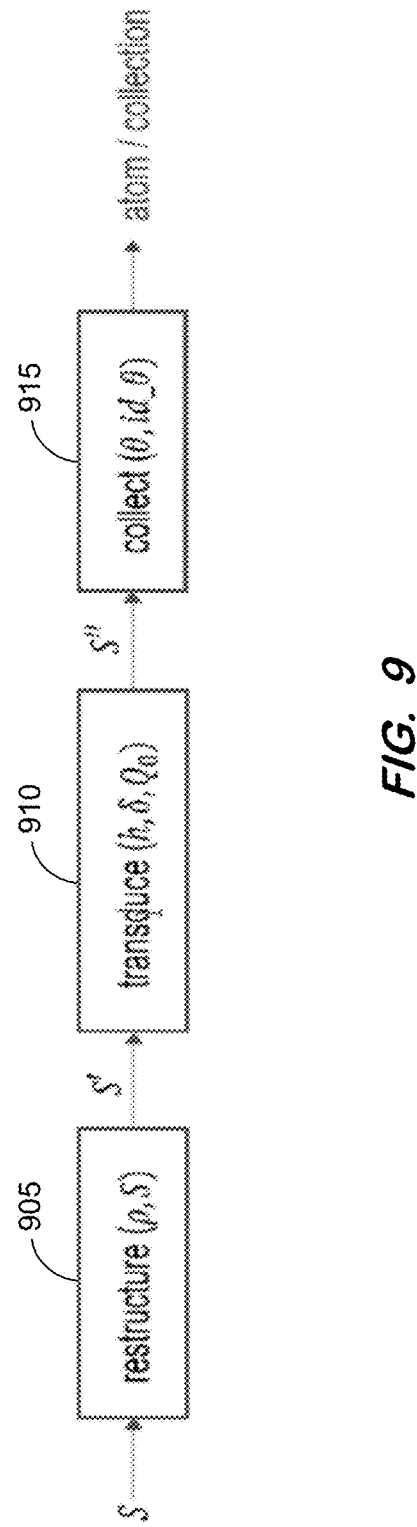
FIG. 9 is an illustrative depiction of the example data pipeline translated into a plurality of basic mappings, in accordance with some embodiments.

The basic mappings depicted in FIG. 9 are defined as follows. First, restructure mapping 905 recursively applies a restructuring mapping ρ to each element of a collection such that:

restructure(ρ,S)=restructure1(ρ,ρ(S))

restructure1(ρ,< >)=< > restructure1(ρ,<x>)=<x> restructure1(ρ,$S_1 \diamond S_2$)=restructure1(ρ,ρ($S_1$)) $\diamond$ restructure1(ρ,ρ($S_2$))

Then, transduce mapping 910 applies a stateful transformation (i.e., a transduction) to each element of a collection such that:

transduce(h,δ,Q,< >)=< > transduce(h,δ,Q,<x>)=h(Q,x)

transduce(h,δ,Q,$S_1 \diamond S_2$)=transduce(h,δ,Q,$S_1$) $\diamond$ transduce(h,δ,δ(Q,$S_1$),$S_2$)

Collect mapping 915 recursively applies a binary mapping to all elements of a collection such that:

collect(θ,id,< >)=id collect(θ,id,<x>)=x collect(θ,id,$S_1 \diamond S_2$)=collect(θ,id,$S_1$)θcollect(θ,id,$S_2$)

FIG. 10 includes a flow diagram of an illustrative process 1000 that might be performed by some or all of the elements of an embodiment described herein. The flow charts described herein do not imply a fixed order to the steps, and embodiments of the present invention may be practiced in any order that is practicable. Note that any of the methods described herein may be performed by hardware, software, an automated script of commands, or any combination of these approaches. For example, a computer-readable storage medium may store thereon instructions that when executed by a machine result in performance according to any of the embodiments described herein.

Operation 1005 includes receiving configuration properties of a group of operators, G, of a data pipeline, where the data pipeline is defined or otherwise configured to have a specified multiplicity greater that one (1). In some embodiments, an operation (not shown in FIG. 10) before or in cooperation with operation 1005 might determine, request, or otherwise ascertain that the data pipeline does indeed have a multiplicity greater than one. As disclosed above, the data pipeline comprising a group or groups of operators and having a multiplicity greater that one can be replicated into multiple instances. One or more processing nodes of a distributed processing network may be implemented to execute operation 1005, where the configuration processes are inputs to the one or more processing nodes. Further fundamental constraints regarding the data pipeline processed by process 1000 will be disclosed in greater detail below, including, for example, constraints and characteristics of the configuration properties that may be associated with a group G to specify fundamental aspects of an inherently parallel computation implemented by the group.

Operation 1010 includes generating a configuration for two new operators, including a first new operator and a second new operator. One or more processing nodes of a distributed processing network may be implemented to execute operation 1010, where the generated new operators are an output of the one or more processing nodes. In some embodiments, the first and second operators generated at operation 1010 correspond to a Restructure operation and a Collect operator, respectively. Detail aspects and example of these two operators are provided below in greater detail.

Continuing with process 1000 to operation 1015, the generated first new operator and second new operator may be inserted into a deployment of the data pipeline when the data pipeline executes (i.e., at runtime). The first new operator may be inserted before the replicas of the group G of operators of the data pipeline (where the replicas correspond to the specified multiplicity of the group(s)) and the second new operator may be inserted after the replicas of the group of operators of the data pipeline. In some embodiments, the first new operator (the "Restructure" operator) is inserted before the replicas of the group on each input connection corresponding to a dataset. For instance, if a group has multiple inputs, the Restructure operator is inserted on each input connection to a replica. Significantly, process 1000 provides a mechanism that guarantees the result of the deployed data pipeline is the same as or equivalent to a result that might be obtained using a deployed data pipeline when no group is replicated.

Several examples of mappings that are inherently parallel and can be expressed as divide-and-conquer mappings are now presented to illustrate one or more aspects of the present disclosure.

Referring to the previous example of "2 add(S)" discussed hereinabove, a mapping can be defined as divide-and-conquer mapping over a set as follows:

$$2add(<\ >)=<\ >$$

$$2add(<x>)=<x+2>$$

$$2add(S_1 \Diamond S_2)=2add(S_1) \cup 2add(S_2)$$

A mapping can be defined as a divide-and-conquer mapping over a stream as follows:

$$2add(<\ >)=<\ >$$

$$2add(<x>)=<x+2>$$

$$2add(x \Diamond S)=2add(x)*2add(S)$$

The previous example hereinabove of the aggregate "count(S)" can be defined as divide-and-conquer mapping over a set as follows:

$$count(<\ >)=0$$

$$count(<x>)=1$$

$$count(S_1 \Diamond S_2)=count(S_1)+count(S_2)$$

An example of a mapping defined as a "stream transducer" will now be introduced. A function "movA (m, S)" computes the moving average of size m of an input bounded stream S. The first equation immediately below translates movA into a function winA that takes, as a second argument, a "state" initialized with an empty stream. The fourth equation iterates over the stream and incrementally computes a state Q that accumulates a sliding window of size m−1, as defined by function win in the last equation. Note that $S_1$ represents a unit stream containing the head of $S_1 \Diamond S_2$. The third equation indicates that when a next element x is found in the stream, if the incremental state Q contains m−1 elements, then x is appended to Q and the value of the average of Q is appended to the result. If the size of Q is smaller than m−1, then an empty stream value is added to the result.

$$movA(m,S)=winA(m,<\ >,S)$$

$$winA(m,Q,<\ >)=<\ >$$

$$winA(m,Q,<x>)=if(count(Q)<m-1,<\ >,avg(Q*<x>))$$

$$winA(m,Q,S_1 \Diamond S_2)=winA(m,Q,S_1)*winA(m,win(m,Q,S_1),S_2)$$

$$win(m,Q,[x])=if(count(Q)<m-1,Q*[x],all\_but\_first(Q)*[x])$$

Figure 11:
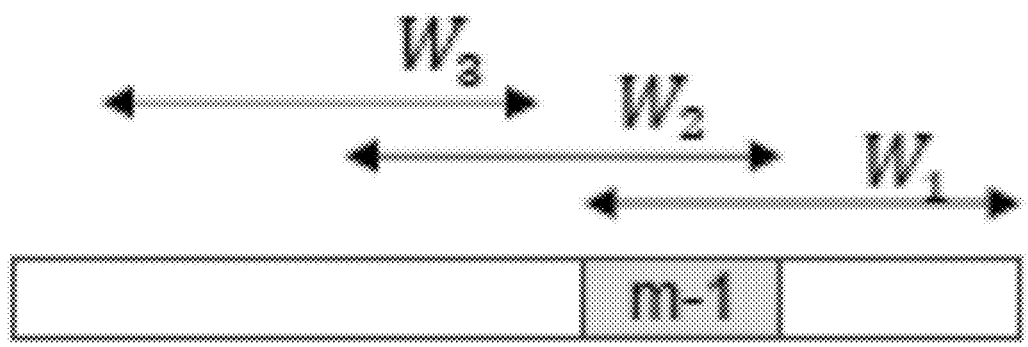
FIG. 11 is an illustrative example of how elements of a stream might be obtained, in accordance with some example embodiments.

In the next example, group G implements a variation of the previous function "movA", called "movA_2 (m, 1, S)" defined by the equations below. In the first equation, an input stream S of size>m is restructured into an ordered collection of overlapping streams of size m with period 1, using function winSlide (m, 1, S). The diagram of FIG. 11 shows an example of how windows might be obtained. Function winA_2 is applied to the restructured result. The fourth equation defines the recursive iteration over the collection of streams. Accordingly, x in that equation denotes a unit stream. The third equation computes the average value over the elements of stream x.

$$movA\_2(m,1,S)=winA\_2(winSlide(m,1,S))$$

$$winA\_2([\ ])=[\ ]$$

$$winA\_2([x])=avg(x)$$

$$winA\_2(x \cdot S_2)=winA\_2(x)*winA\_2(S_2)$$

Note that the result produced by this implementation of G is the same as the result produced by previous specification of movA, but the specification of G uses a restructure operation (using mapping ρ in the general definition of a divide-and-conquer mapping) instead of a transducer.

The next example of computation for group G is the function "CountByA(S)" that operates over a set of tuples of the form (A: string, B: integer), where components A and B are called attributes. The input set is restructured into a set of groups, that is, a set of tuples of the form (A: string, S') where S' is itself a partition of input S. The grouping is done by function groupByKey. Then, function countByA recursively iterates over the restructured set until a singleton set or an empty set is found. Then, function count (previously defined) is used to compute a result for each singleton set.

$$CountByA(S)=countByA(groupByKey(A,S))$$

$$countByA(\{\ \})=\{\ \}$$

$$countByA(\{(k,S)\})=\{(k,count(S))\}$$

$$countByA(S_1 \cup S_2)=countByA(S_1) \cup countByA(S_2)$$

A last example is a function, called "movA_3 (m, S)" that uses both a restructure of its input and a transducer with a state. It is assumed the input is a set of tuples (A: string, B: integer). In the first equation immediately below, the input set is restructured by sorting its elements on their attribute value A. Then, the remaining equations specify a stream transducer similar to previous function movA, except that function "avg_B" computes the average of the B attribute values of the elements in its stream argument.

$$movA\_3(m,S)=winA(m,<\ >,sortByKey(A,S))$$

$$winA(m,Q,<\ >)=<\ >$$

$$winA(m,Q,<x>)=if(count(Q)<m-1,<\ >,avg\_B\\(Q^*<x>))$$

$$winA(m,Q,S_1 \Diamond S_2)=winA(m,Q,S_1)^*winA(m,win(m,Q,\\S_1),S_2)$$

$$win(m,Q,<x>)=if(count(Q)<m-1,Q^*<x>,all\_but\_first\\(Q)^*<x>)$$

When a group has an output that is computed from multiple input datasets, it might be necessary to capture how the inputs are "synchronized" in a divide-and-conquer mapping. To explain this aspect, an example of a sort merge "sortMerge(R,S)" between two input streams R and S composed of atomic values and respectively sorted on their values is used.

The definition uses one of the streams as the initial state of a transducer and incrementally consumes this state while simultaneously consuming the other stream. This aspect can be defined as shown in the equations immediately below. In the first equation, stream S is defined as the initial state for mapping F and stream R is the input over which F iterates. Equation four iterates over stream R, later called the "iterator" input, while the state transition function consumes state Q using a function after(Q, $R_1$), which takes the last element r in stream $R_1$ and extract from Q the sub-stream whose first element is greater than r. The third equation either outputs the unit stream<x> or appends the sub-stream of Q whose last element is less or equal to the last element of <x>, which is the result of before(Q, <x>). Therefore, the definition of sortMerge is a stream transducer.

$$sortMerge(R,S)=F(S,R)$$

$$F(Q,<\ >)=Q$$

$$F(Q,<x>)=if(Q=<\ >,<x>,before(Q,<x>)<x>)$$

$$F(Q,R_1 \Diamond R_2)=F(Q,R_1) \Diamond F(after(Q,R_1),R_2)$$

A further mapping example includes an example of a "join" operation between two sets R and S, consisting respectively of tuples of type (A: string, B: integer) and (A: string, C: string), using an equality join condition on their common "key" attribute A.

The join is expressed by the following divide-and-conquer mapping. Set S is defined as the initial state of a transducer combine1. In the first equation below, a restructure operation ρ transforms the set R into a set of groups of the form (k, R'), where k is a value of attribute A in R, and R' is the maximal subset of tuples in R that have a value of attribute A equal to k. In the last equation, combine1 is recursively applied to each element of the restructured set R; it exits when either a singleton set (i.e., a group) or an empty set is found. In the third equation, function $MAP_1$ extracts the set R' from a group P=(k, R'). Function $MAP_2$ gets the maximal subset of Q, whose elements have the same key value k (i.e., value of attribute A) as group P. Finally, combine2 performs the actual join operation between the two sets on their key attribute: it builds the output elements by concatenating each pair of input tuples (which by construction already match on their key attribute value). All results are union-ed by the collection constructor.

$$join(key,R,S)=combine1(key,S,\rho(R))$$

$$combine1(key,Q,<\ >)=<\ >$$

$$combine1(key,Q,<P>)=combine2(key,MAP_2(P,Q),\\MAP_1(P))$$

$$combine1(key,Q,R_1 \Diamond R_2)=combine1(key,Q,R_1)\\\Diamond combine1(key,Q,R_2)$$

Note that this specification captures multiple join algorithms depending on ρ. When ρ returns a group holding a single element of R, or an arbitrary partition of R, then function join describes a "nested loop" join. When ρ returns a group holding a set of elements of R with the same key value, function join describes a "hash-based" join.

Here again, we specify that in some embodiments the subset in S that is necessary to compute the value associated with an element x of R. In this case, this is the result of $MAP_2$(P, S), which expresses a "binding" between a group P of R and S.

Regarding configuration of a divide and conquer mapping, we provide configuration properties associated with the input ports of a group of operators. The properties include the characteristics of a "restructure" mapping (e.g., FIG. 9, 905).

The following configuration properties can be specified for an input port, including the type of port (property "portType"), and whether the data is ordered or not (property "isOrdered"). It may be assumed that the schema of the dataset is available as another configuration property. The configuration properties may specify a possible restructuring of the input dataset into another dataset (property "restructure"). In that case, the "isOrdered" property characterizes the restructured dataset.

The question that might be asked when setting the restructure property of a group G is: "Is the transformation computed by G of the form f(S)=F(p(S))?", where p(S) returns a dataset (possibly nested) and group G computes a result value for each element of that dataset using some function F.

The following possible restructure configurations are provided, expressed as mappings in table 1200 of FIG. 12. In FIG. 12, whenever an array of "keys" [K] is specified in a restructure configuration mapping, it means that the input S consists of a collection of tuples and each key value in [K] designates an attribute name in each tuple.

In some embodiments, all configuration properties of a divide-and-conquer mapping might be expressed using a JSON notation. FIG. 13 includes an example of configuration of an input port "in1" with a restructure configuration mapping: windowSlide(10, 9, S). Note that the property "isOrdered" indicates that the dataset received is ordered.

FIG. 14 includes an example representation of a restructure mapping groupByKey([A], S), where S is a set of tuples of type (A: string, B: integer). In the case of a restructure partitionByKey([A], S), the name of the JSON element "grouping" would simply be replaced by "partitioning".

FIG. 15 includes a representation of an example of restructure mapping windowByKey([A, B], S), where S is a stream of tuples of type (A: string, B: integer, C: string).

FIG. 16 includes a representative example of restructure mapping sortByKey ([A], S) over the same stream of tuples as before.

Regarding configuration properties of the output ports of a group, the configuration properties can be specified for an output port to include the type of port (property "portType"), and whether it is ordered or not (property "isOrdered"). It may be assumed that the schema of the dataset is available as another configuration property. A transducer (property "transduce") that includes two (mandatory) properties, including an "iterator" property that indicates the input dataset on which a transduction is applied and the property "isStateless". Additional properties may depend on whether an output port is associated with a single or multiple input ports. If a "transduce" property is stateless, these additional properties might not be needed. The definition of an aggregate function (e.g., property "aggregateFunction") agg_F when the result ("outputType") is a scalar value. This aggregate function must be distributive, in some embodiments. That is, there exists an aggregate function agg_G such that agg_F(S)=agg_G(agg_F($S_0$), ..., agg_F($S_n$)), for any partitioning of partition S into sub-collections $S_0$, ..., $S_n$. We call function agg_G the collector function for agg_F.

In some aspects, when the output port of a group is computed from a single input dataset, and the divide-and-conquer mapping specification includes a stateful transducer, the following property exists. A "bindPrefix" property indicates the input dataset (name of the input port) used to compute the output, and the size (i.e., a number of elements) of the subsequence (property "range"), preceding each element x of the input, from which the state of the transducer is computed.

In some aspects, when the output port of a group is computed from multiple input datasets, the "transduce" element of the output associated with these multiple inputs might be configured to include a special element called "bindingInputs" that expresses the binding that exists in the divide-and-conquer mapping between one input called an "iterator" and the other inputs viewed as "input states".

The feature or aspect of binding will now be illustrated with an example. Considering the previous example of sortMerge, the iterator of the transducer is the stream R and the input state is S. Both streams consist of atomic values that are assumed to be sorted. As in the case of a function with a single input, we specify the sub-stream in S that is used to compute the value associated with an element x of R. In this case, this is the result of before(S, <x>) that expresses a "binding" between the two input streams. This binding is referred to as bindByOrderedValue, as specified below.

sortMerge(R,S)=F(S,R)

F(Q,< >)=Q

F(Q,<x>)=if(Q=< >,<x>,before(Q,<x>) ◊ <x>)

F(Q,$R_1R_2$)=F(Q,$R_1$) ◊ F(after(Q,$R_1$),$R_2$)

Figure 17:
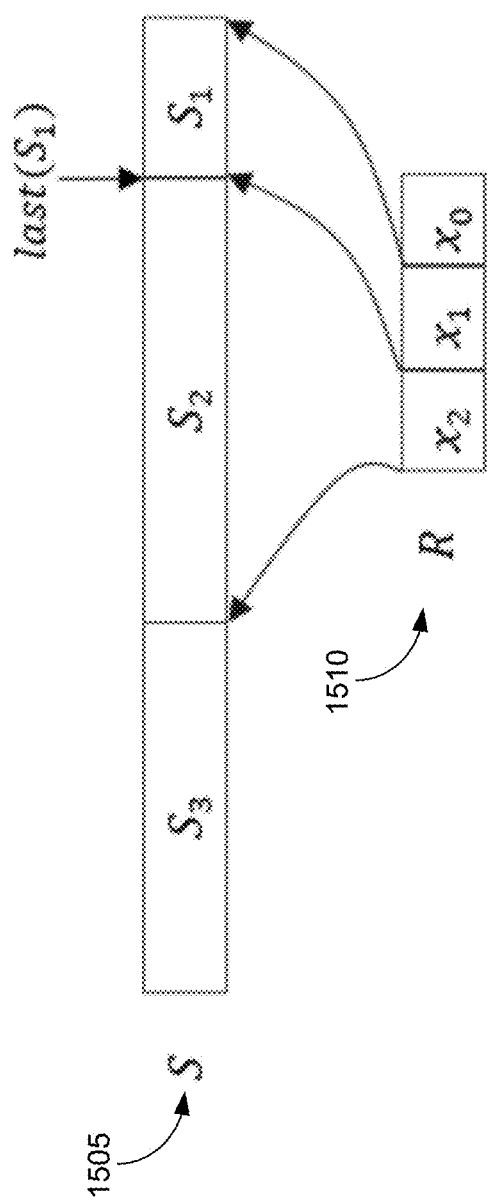
FIG. 17 is an illustrative example of some aspects related to a binding that exists in a divide-and-conquer mapping, in accordance with some example embodiments.

The diagram of FIG. 17 illustrates the above binding. As illustrated, stream R 1510 includes three elements $x_0$, $x_1$, $x_2$ over which the binding function iterates. First, the binding tries to fetch the sub-stream $S_0$ of stream S 1505 such that value(last($S_0$))≤value($x_0$), which represents the state that must be associated with $x_0$. This returns an empty stream. Next, the binding fetches the sub-stream $S_1$ of S such that value(last($S_1$))≤value($x_1$). A similar reasoning is used for $x_2$. The last element of stream R, which halts the iteration, is the empty stream that will fetch sub-stream $S_3$.

In some embodiments, the following types of "binding" might be provided, expressed in table 1800 of FIG. 18 as functions. In table 1800, argument S is an iterator while the array of inputs, denoted [input], represents the other inputs viewed as states. The meaning of "key" is the same as defined hereinabove.

In some embodiments, a "transduce" element may be encoded using a JSON notation. An illustrative example representation of this aspect, FIG. 19, shows the configuration of an output port in the case of a stateless transducer mapping 2add over an input stream received on input port "out1".

The illustrative example representation depicted in FIG. 20 shows the configuration properties of output port "out1" for computation movA. The computation of output "out1" involves a stateful transducer that involves a single input dataset "in1". Hence, a binding of type "bindByPrefix" is defined. The property "range" defines for any element x of the iterator stream, the size of the prefix of x in the stream that is used to compute the state associated with x. In this example, the value indicates that the prefix contains the m−1 elements (for some value of m) preceding x in the input stream.

Another divide and conquer mapping example representation, as depicted in FIG. 21, shows a configuration of output port "out1" for the computation sortMerge introduced above. The iterator input in the "transduce" is specified by an input port name ("in1"). For each input different from the iterator input, a "bindingConditions" array is defined containing an element with property "stateInput" indicating an input port.

Another divide and conquer representative example, as illustrated in FIG. 22, shows the configuration properties of output port "out1" for the mapping count presented earlier. The property "portType" for "out1" indicates that the result is a scalar. As seen, the mapping is a stateless transducer and property "aggregateFunction" indicates that the input elements transformed by group G are aggregated using function sum to return a scalar value.

Another divide and conquer representative example, FIG. 23, shows the configuration properties of output port "out1" for the join mapping introduced before. The binding is of type bindByKey([A], S) and the "bindingConditions" specifies the array of attribute names that should be used as a key (in that case a single attribute named "A").

We now disclose a method that uses the configuration properties of a divide-and-conquer mapping of a group G to generate a data pipeline in which G can be executed in parallel. In some embodiments, the generation of the data pipeline that can be executed in parallel includes, in general, three steps. In an initial step, the "restructure" properties of the inputs are analyzed and a candidate configuration of a new generic operator, "Restructure", is generated. Secondly, the "transduce" properties of each output are analyzed and another candidate configuration of Restructure operator is generated. The candidate configurations of the Restructure operator may be checked and composed. Finally, a configuration of a Collect operator is produced.

Regarding configuration of a Restructure operator from "restructure" properties, the "restructure" part of a configuration determines a candidate function for the Restructure operator as follows. The goal of the Restructure operator is twofold, including (1) to make sure that all data that must be processed together is sent to the same replica, and (2) to satisfy the typing constraints of the input data received by each replica.

Restructure Rule 1: Suppose that a divide-and-conquer mapping is of the form: $f(S)=F(\rho(S))$ for some restructure mapping $\rho$ and some stateless transduce F. Then, suppose that $\rho(S)$ returns a collection of elements noted $\Diamond(P_1, \ldots, P_n)$. In some aspects, we configure the Restructure operator with a mapping $\rho'$ such that: if $\rho'(S)=S'=\Diamond(P_1', \ldots, P_q')$ then $\Diamond(\rho(P_1'), \ldots, \rho(P_q'))=\Diamond(P_1, \ldots P_n)$ and type (S')=type(S). Relying on this property, $F(\rho(\rho'(S))=F(\rho(S))$, and by definition of F as a stateless mapping, the Restructure operator can safely dispatch the elements of S' to the different replicas and use the collection constructor to gather the results of each replica.

Regarding constraints for streams, note that technically speaking, if $\rho(S)$ is an ordered collection: $P_1 \Diamond (P_2 \Diamond (\ldots \Diamond P_n) \ldots )$ then $\rho'(S)$ must return an ordered collection so that $\rho(P_1') \Diamond (\rho(P_2' \Diamond ( \ldots \Diamond \rho(P_q') \ldots )=P_1 \Diamond (P_2 \Diamond (\ldots \Diamond P_n) \ldots )$. To achieve this, the following constraints are observed.

For a first constraint, C1, each element of S' is assigned a System Sequential Number (SSN) by the Restructure operator. For another constraint, C2, the group G that implements f(S) transports the SSN of each (iterator) input element used to generate an output element (by assumption of stateless computation, each output element is associated with a single input element). An additional constraint, C3, dictates that the Collect operator ensures that the final output is delivered in the order of the SSN of the output elements and the respective order of output elements with the same SSN on each connection reaching the Collect operator.

In some aspects, constraint C2 impacts the implementation of the operators contained in the subgraph of group G. However, C2 does so only at the level of the manipulations of messages received and sent on the ports of operators. C2 does not impact the "black box processing" of each operator. Constraint C3 will be discussed in greater detail below in conjunction with an explanation of how to compute the configuration of a Collect operator.

Table 2400 included in FIG. 24 describes an example configuration of a Restructure operator, in the case of a mapping $f(S)=F(\rho(S))$, where F is a stateless transduce, depending on the configuration of property "restructure". As shown in table 2400, for sets where the "restructure" mapping is configured using partitionByKey([K], S) or groupByKey([K], S), the Restructure operator is configured using a function dispatchByKey([K], S). This function behaves like partitionByKey, except that each partition is assigned to a replica. More formally, suppose that $\rho'(S)$=dispatchByKey([K], S)=$\Diamond(P_1', \ldots, P_q')$, then if $\rho(S)$=partitionByKey([K], S)=$(P_1, \ldots, P_n)$, we have: q=n, and $\Diamond(\rho(P_1'), \ldots, \rho(P_q'))=\Diamond(P_1, \ldots, P_q)$. The same is true for $\rho(S)$=groupByKey([K], S). Furthermore, since S is unordered, the above constraints for streams do not apply.

Still referring to FIG. 24, for sets/streams when the "restructure" mapping is configured with sortByKey ([K], S), the Restructure operator is configured with function dispatchBySortedKey(M, [K], S), which first sorts S accordingly and then dispatches subsequences of the resulting stream of size M, with the above constraint C1 for the Restructure operator, to the replicas. Here again, the conditions of the Restructure Rule 1 are obviously satisfied.

When the "restructure" mapping is configured with mapByCondition(P, S), the Restructure operator is configured with function dispatchByChunk(M, S), which partitions the input S into sub-collections of size M and sends each sub-collection to a replica. Since mapByCondition(P, $S_1 \Diamond S_2$)=mapByCondition(P, $S_1$)$\Diamond$ mapByCondition(P, $S_2$), and F is a stateless transducer, $F(\rho(S_1 \Diamond S_2))=F(\rho(S_1)) \Diamond F(\rho(S_2))$, and dispatchByChunk(M, S) satisfies the conditions of Restructure Rule 1. If the collection is ordered, the above constraint C1 is enforced by the Restructure operator.

For streams when "restructure" mapping is configured with windowSlide(N, m, S), Table 2400 specifies the Restructure operator is configured with function dispatchBySlidingWindow(M, m, S), where M is a hyper-parameter. Here, the input S is transformed into sliding windows of size M≥N with an overlap of m elements with the previous window, and each window is sent to some replica together with an SSN corresponding to the respective positioning of the sub-stream in the original input stream (as defined by constraint C1). In some embodiments, we only care about the overlapping constraint between the windows that will be dispatched. Accordingly, parameter M can be determined to best balance the load between replicas and optimize the transfer of data between operators.

For streams where the "restructure" mapping is configured with windowByKey([K], S), operator Restructure is configured, as specified in table 2400, with function dispatchByKeyedWindow([K], S) that partitions S into windows, as with windowByKey([K], S), and dispatches each window to some replica. In this instance, the previous constraint for streams (constraint C1) is enforced by the Restructure operator.

Regarding a configuration of a Restructure operator from "transduce" properties (i.e., the "transduce" part of the configuration of output ports), first consider the case of an output that is associated with a single input. When the "transduce" property specifies a stateless transducer, the Restructure operator is configured with function dispatchByChunk(M, S) that simply partitions an input collection S into sub-collections of size M, a hyper-parameter. If the input collection is ordered, then the previous constraint (C1) must be satisfied by the Restructure operator.

In the case the "transduce" property specifies a stateful transducer, the goal of the configuration is twofold in some embodiments, including (1) to ensure that the state for the processing of each element x of an input collection is part of the data sent to the replica that processes x, and (2) to minimize the amount of data that is transferred to a replica (i.e., minimize redundancy).

For example, suppose that an output is associated with a single input dataset and the divide-and-conquer mapping is of the form: $f(S)$=transduce(h, $\delta$, $Q_0$, S) for some mapping h, state transition mapping $\delta$, and initial state $Q_0$. By definition of a transduce, to compute the value of element $x_1$ of S, we first compute state $Q_i=\delta(Q_{i-1}, x_{i-1})$ and then the value of $h(Q_i, <x_i>)$. Suppose that a Restructure operator partitions input S into sub-streams and sends a sub-stream $S'=x_i \Diamond (\ldots \Diamond \Diamond x_k) \ldots)$ to a replica. To get a correct result for value $x_i$, the replica should execute transduce($h, \delta, Q_i, S'$). However, this is different from $f(S')$ because the initial state should be $Q_0$ and not $Q_i$. As such, it would violate our principle of parallel execution of a group that requires the performance of the same computation in each replica and only varying the input data that is passed to the replica. This aspect leads to the next rule.

Restructure Rule 2—for one input: If a divide-and-conquer mapping is of the form: $f(S)$=transduce($h, \delta, Q_0, S$), then the Restructure operator must first partition the input stream S into a collection of sub-streams: $S_0, S_1, \ldots$, where $S_i = x_i \Diamond (\ldots x_k) \ldots)$, and then append to each sub-stream $S_i$ a prefix $P_i$ such that: (1) $Q_i$ can be computed from $P_i$, and (2) for each $x_j \in P_i$, $h(Q_j, x_j) = <>$.

When "transduce" is configured with bindByPrefix(S, m), a Restructure operator is configured with function dispatchBySlidingWindow(M, m, S), where M≥m is a hyper-parameter. This aspect is summarized in a table 2500 in FIG. 25. By construction, the two above conditions of Restructure Rule 2 are satisfied. In addition, when the input S is a stream, the previous constraints (C1 to C3) apply to preserve the order in which elements are processed.

In some aspects, there might be a consideration of a performance tradeoff. For example, in the instance where adding a prefix to each sub-stream increases the redundancy of data sent to the replicas. Condition (2) in the above rule avoids generating unexpected values in the result caused by the presence of the redundant elements in the prefix. That is, elements that will be processed multiple times through possibly different replicas of the group implementing mapping f. The cost of redundant data sent to the replicas is traded against the expected gain obtained from the parallel computation of f(S) that depends on the processing time of function h. In some aspects, the more costly h is, the greater benefit gained from a parallel execution of f.

Next, consider the case of an output port associated with multiple input datasets $S, S_1', \ldots, S_n'$. As we have seen before, the "transduce" property includes a "bindingInputs" construct that specifies a computation of the form: $f(S, S_1', \ldots, S_n')$=transduce($h, \delta, Q_0=(S_1', \ldots, S_n'), S$), where S is the iterator set, and $(S_1', \ldots, S_n')$ forms the initial value $Q_0$ of a state that is incrementally computed. However, unlike the case of a single input, the state of the transducer is a dynamic input of the group that implements the divide-and-conquer mapping. That is, each input $S_1', \ldots, S_n'$ corresponds to an input port of the group. Hence, the state needed by each replica of the group can be computed by the Restructure operator associated with the connection of each input port of $S_1', \ldots, S_n'$. The configuration of the Restructure operator for $S_1', \ldots, S_n'$ is defined by the following rule, Restructure Rule 2, for multiple inputs.

A Restructure Rule 2 supposes that a divide-and-conquer mapping is of the form: $f(S, S_1', \ldots, S_n')$=transduce($h, \delta, Q_0=(S_1', \ldots, S_n'), S$), where S is the iterator set, and $(S_1', \ldots, S_n')$ forms the initial value $Q_0$ of the state of the transducer. Suppose that the Restructure operator for S partitions S into a collection of elements: $\rho(S) = \Diamond (P_1, \ldots, P_q)$. Here, we configure the Restructure operator for each input $S_i'$ with a function $\rho'$ such that (1) for each $P_i$, state $Q_i$ can be computed from $(\rho', S_1', P_i), \ldots, \rho'(S_n', P_i))$ and (2) type $(\rho'(S_j', P_i))$=type $(S_j')$.

Table 2400 in FIG. 24 describes the configuration of a Restructure operator (using a function $\rho'$ as per the above rule), in the case of a mapping $f(S, S_1', \ldots, S_n')$=transduce($h, \delta, Q_0=(S_1', \ldots, S_n'), S$). As illustrated in table 2500 in FIG. 25, when a "transduce" property is configured with a binding bindByOrderedValue(S, $[S_1', \ldots, S_n']$), for some streams $S, S_1', \ldots, S_n'$, the Restructure operator for iterator S is configured with function dispatchByBindingChunk(M, S) that returns an ordered collection of streams: $\Diamond (P_1, \ldots, P_q)$. In addition, the Restructure operator for S builds a corresponding array of tuples $[(n_1, r_1, v_1), \ldots, (n_q, r_q, v_q)]$ where $n_j$ is the SSN associated with $P_j$, $r_j$ is a replica id to which $P_j$ is assigned, and $v_j$=last($P_j$). The Restructure operator for any input $S_i'$ is then configured with a function dispatchByBoundedValue($S_i', [(n_1, r_1, v_1), \ldots, (n_q, r_q, v_q)]$), which partitions $S_i'$ into sub-streams $S_{i,1}', \ldots S_{i,q}'$ such that: (1) for j<q, last($S_{i,j}'$)≤$v_j$ and first($S_{i,j}'$)>$v_{j-1}$ and (2) for $S_{i,q}'$, first($S_{i,q}'$)>$v_{q-1}$. Then, each sub-stream $S_{i,j}'$ is assigned to replica id $r_j$ with SSN $n_j$.

Figure 26:
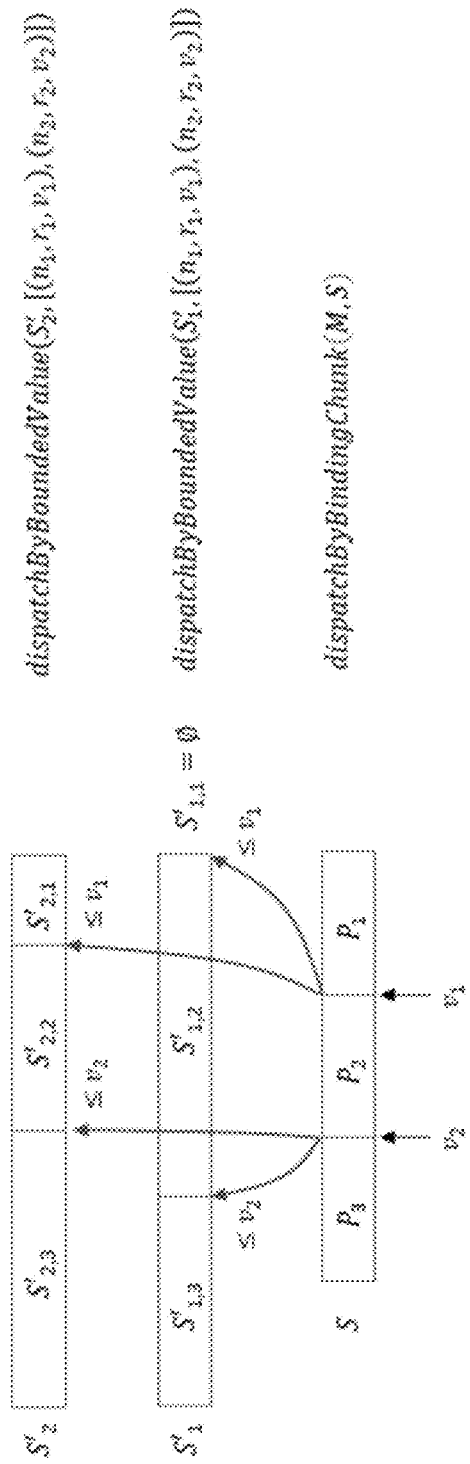
FIG. 26 is an illustrative depiction of a function, in accordance with some example embodiments.

FIG. 26 illustrates how a function dispatchByBoundedValue works in the case of a mapping: $f(S, S_1', S_2')$=transduce($h, \delta, Q_0=(S_1', S_2'), S$). For example, a given replica may receive on its respective input ports the sub-streams: $P_j, S_{1,j}', S_{2,j}'$ and will produce as output an ordered stream containing the result of $f(P_j, S_{1,j}', S_{2,j}')$. Then, it may receive the sub-streams: $P_k, S_{1,k}', S_{2,k}'$ and will proceed similarly. The important property to note here is that the results of the replicas can simply be appended in the right order (based on their respective SSN) using a Collect operator to produce the result of the mapping $f(S, S_1', S_2')$.

When a "transduce" property is configured with a binding bindByOrderedKey(S, $[S_1', \ldots S_n']$, K), for some streams $S, S_1', \ldots, S_n'$, the Restructure operator for iterator S is configured with function dispatchByKey([K], l) that returns an unordered collection of streams $\Diamond (P_1, \ldots, P_q)$ for q values of K in S. The Restructure operator for S then builds a corresponding array of tuples $[(r_1, v_1), \ldots, (r_q, v_q)]$, where $r_j$ is a replica id to which $P_j$ is assigned, and $k_j$ is a value of K in S. The Restructure operator for any input $S_i'$ is configured with a function dispatchByBoundedKey($S_i', [(r_1, k_1), \ldots, (r_q, k_q)]$) that returns sub-streams $S_{i,1}', \ldots S_{i,q}'$ such that $S_{i,j}'$ is the maximal sub-stream of $S_i'$ containing elements that have a key value K equal to $k_j$. Then, each sub-stream $S_{i,j}'$ is assigned to replica $r_j$. These aspects are also summarized in table 2500 in FIG. 25. By definition of a transducer, transduce($h, \delta, Q_0=(S_1', \ldots, S_n'), <>)=<>$, so the elements of $S_i'$ that have a key value K that is different from each value of $\{k_1, \ldots, k_q\}$ will be discarded and not sent to any replica. Accordingly, a replica will receive on its input ports sub-streams $P_j, S_{1,j}', S_{2,j}'$ of elements that either have the same key value K or can be empty in the case of $S_{1,j}', S_{2,j}'$.

The case where a "transduce" property is configured with a binding bindByKey(S, $[S_1', \ldots, S_n']$, [K]) is handled similarly, as listed in table 2500 of FIG. 25. Also, when a "transduce" property is configured with a bindingbindCross (S, [input]), the Restructure operator for iterator S is configured with function dispatchByChunk(M, S). Here, the Restructure operator for an input $S_i'$ simply sends the input to each replica.

As discussed hereinabove, a Restructure operator can be configured from a "restructure" property or a "transduce" property. We will now disclose how to handle the case when both of these properties are defined.

We propose a Restructure Rule 3 regarding a composition of a Restructure operator. Suppose that a divide-and-conquer mapping is of the form: $f(S, S_1', \ldots, S_n')$=transduce($h, \delta, Q_0=S_1', \ldots, S_n'$), restructure ($\rho$, S)). Let $\rho'$ and $\rho''$ be the candidate functions for configuring the Restructure operator for S, respectively from the "restructure" and the "transduce" properties of the mapping f. Then, $\rho''$ o $\rho'$ will be used to configure the Restructure operator for S.

We have the property that dispatchByChunk(M, S) behaves as an identity function in the composition. That is, ρ" o dispatchByChunk(M, S)=ρ"(S).

We propose a Restructure Rule 4 regarding multiple output ports. When a group has multiple output ports, the following constraints apply. First, in some embodiments there is a single iterator input dataset for the entire group. That is, the iterator dataset is the same in all output port configurations. Second, the candidate function returned by the analysis of the "transduce" property of each output port (if that property exists) is identical to configure the Restructure operator for the iterator dataset and any input state dataset that is used in the configuration of more than one output port. When these two constraints are satisfied, the previous composition Rule 3 safely applies.

In some embodiments regarding a generation of a Collect operator, the ordering of data in input and output is first considered. When both the (iterator) input (possibly restructured) and the output are ordered collections, then the Collect operator (e.g., FIG. 7, Collect operator 725) for the output is configured with a function orderedAppend that takes as input elements having an SSN and outputs an ordered collection whose elements are sorted on their SSN. Otherwise, if the (iterator) input is unordered and the output is ordered, then the Collect operator is configured with a function Append that simply uses its input elements to build a stream. When the input and output are unordered, Collect operator is configured with a Union function that performs the union of its input elements without duplicate elimination.

Further regarding the generation of a Collect operator, when an output is of type scalar and is associated with an "aggregate" property, then the Collect operator for the output is configured with the associated aggregate function.

Figure 27:
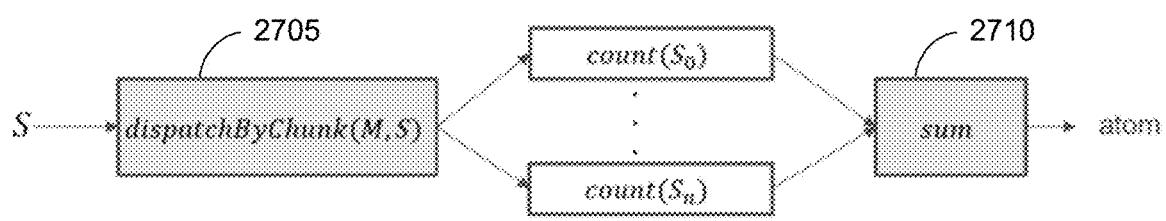
FIG. 27 is an illustrative example of a generated pipeline, in accordance with some example embodiments.

Provided now will be a number of examples to illustrate the generation of parallel pipelines based on some of the examples of mappings defined hereinabove. In a first example, consider the mapping count(S) introduced above. In this example, no input is restructured by a "restructure" property and the "transduce" property is stateless. Thus, as shown in FIG. 27, the Restructure operator 2705 is configured with dispatchByChunk(M, S). Since the output is associated with an aggregate function "sum", Collect operator 2710 is configured with the collect aggregate function for "sum", which is also "sum". This yields the pipeline 2700 depicted in FIG. 27. Note that two partitions produced by the Restructure operator can be sent to the same replica.

Next, consider the mapping countByA(S) with the specification depicted in FIG. 28.

Figure 29:
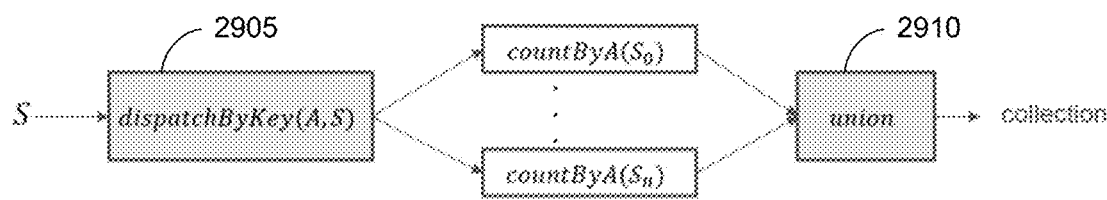
FIG. 29 is an illustrative example of a generated pipeline, in accordance with some example embodiments.

As shown in FIG. 29, the "restructure" property is groupByKey([A], S), so the candidate function for the Restructure operator 2905 is dispatchByKey([A], S). Furthermore, the "transduce" is stateless, so the candidate function for the Restructure operator is: dispatchByChunk (M, S). The composition of these two functions is dispatchByKey([A], S), using the identity property in the composition of dispatchByChunk(M, S). Finally, since both the input and output are unordered, Collect operator 2910 is configured with Union, yielding the pipeline 2900. Note that two partitions produced by Restructure can be sent to the same replica.

Figure 31:
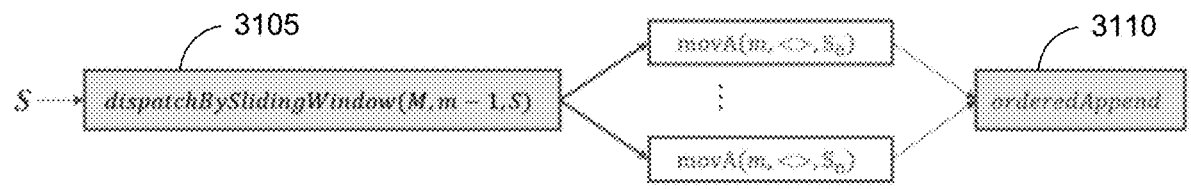
FIG. 31 is an illustrative example of a generated pipeline, in accordance with some example embodiments.

As another example, consider the mapping movA (m, S) defined by the configuration depicted in FIG. 30. In this example, there is no "restructure" property. However, "transduce" is stateful and is defined by bindByPrefix(S, m−1). Accordingly, as illustrated in FIG. 31, Restructure operator 3105 is configured with function dispatchBySlidingWindow(M, m−1, S). Since both the input and output are ordered, Collect operator 3110 is configured with orderedAppend, yielding the pipeline depicted in FIG. 31.

A next example relates to the mapping movA_3 (m, S) defined by the configuration shown in FIG. 32.

Figure 33:
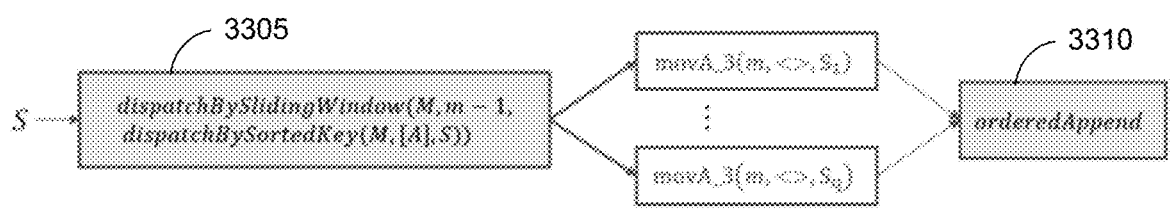
FIG. 33 is an illustrative example of a generated pipeline, in accordance with some example embodiments.

In this example, the "restructure" property is sortByKey ([A], S), so the candidate function to configure the Restructure operator is ρ'=dispatchBySortedKey(M, [A], S). However, the "transduce" property is bindByPrefix(S, m−1), so another candidate function for the Restructure operator is ρ"=dispatchBySlidingWindow(M, m−1, S). According to the composition rule, the function for the configuration of Restructure should be the composition ρ" o ρ'=dispatchBySlidingWindow(M, m−1, dispatchBySortedKey(M, [A], S)). That is, S will be first sorted by key A and then decomposed into an ordered collection of sub-streams of size M, ◊(P$_1$, . . . , P$_q$). Then, for each P$_i$, partitions of size M are created, which exactly returns P$_i$ since it already has size M. Then m−1 elements from the previous sub-stream are added to obtain a window that is dispatched to a replica. Finally, since the input and output are ordered, Collect operator is configured with an orderedAppend. This yields the pipeline 3300 depicted in FIG. 33, including Restructure operator 3305 and Collect operator 3310.

Figure 35:
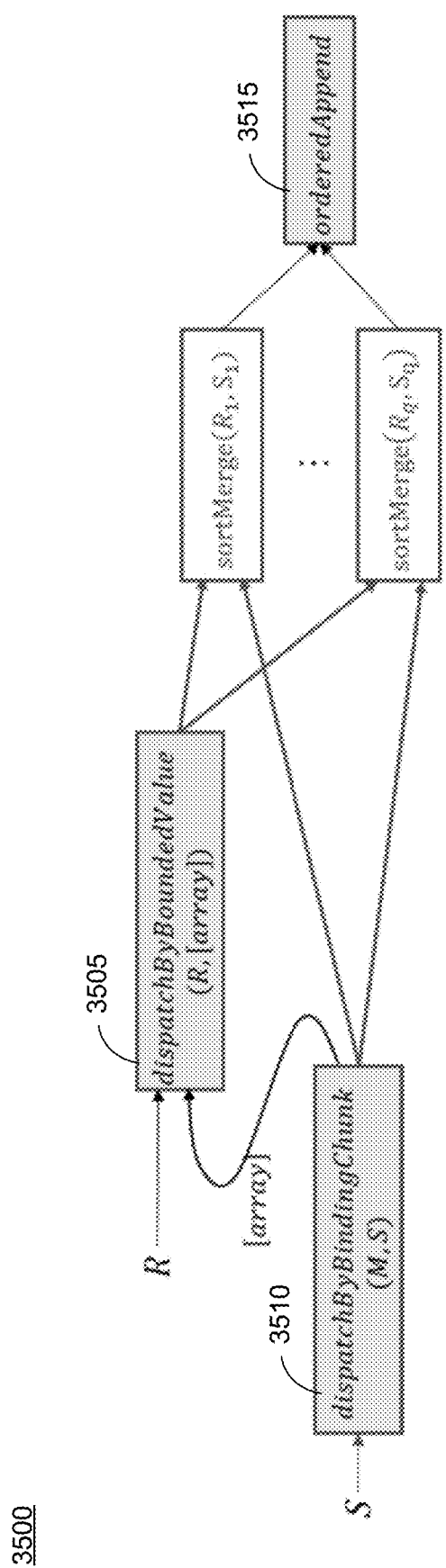
FIG. 35 is an illustrative example of a generated pipeline, in accordance with some example embodiments.

In another example, the mapping sortMerge(R, S) is defined by the configuration depicted in FIG. 34, wherein port "in1" corresponds to input S and port "in2" corresponds to input R. This is a stateful transduce having one iterator S and one input R used as a state. The binding of the input state is defined by bindByOrderedValue(S, [R]). Accordingly, as depicted in pipeline 3500 in FIG. 35, the Restructure operator for S is configured with function dispatchByBindingChunk(M, S), which returns an ordered collection of streams ◊(P$_1$, . . . , P$_q$). Restructure operator 3505 for R is configured with function dispatchByBoundedValue(R, [(n$_1$, r$_1$, v$_1$), . . . , (n$_q$, r$_q$, v$_q$)] 3510, and the array [(n$_1$, r$_1$, v$_1$), . . . , (n$_q$, r$_q$, v$_q$)] must be passed to this operator by the Restructure operator 3305 for S. Finally, since the input and output are ordered, Collect operator 3515 is configured with an orderedAppend.

Figure 37:
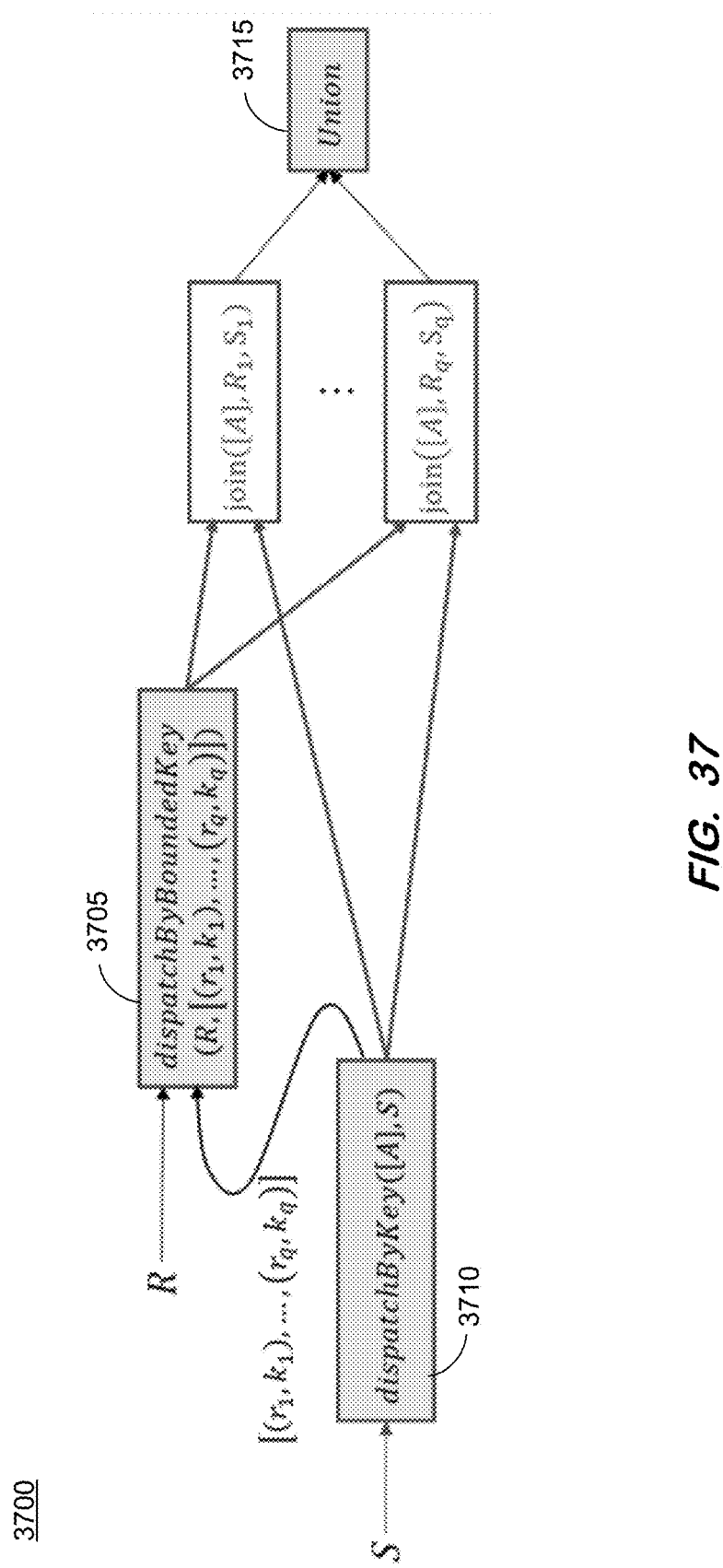
FIG. 37 is an illustrative example of a generated pipeline, in accordance with some example embodiments.

In another example, the mapping join([A], R, S) joins two sets of tuples having in common an attribute A. This mapping is defined by the configuration represented in FIG. 36 in which port "in1" corresponds to input S and port "in2" corresponds to input R. This mapping has no "restructure" property. However, it has a stateful "transduce" with S as an iterator and R as an input state. The binding is bindByKey(S, [R], [A]), so the Restructure operator 3705 in FIG. 37 for S is configured with function dispatchByKey([A], S) 3710, which returns an unordered collection ◊ (P$_1$, . . . , P$_q$) for q values of attribute A in S. Restructure operator 3705 for R is configured with dispatchByBoundedKey(R, [(r$_1$, k$_1$), . . . , (r$_q$, k$_q$)]), where r$_j$ is a replica id to which P$_j$ is assigned, and k$_j$ is a value of attribute A in S. Finally, since the input and output are ordered, Collect operator 3715 is configured with an Union, as illustrated in pipeline 3700.

Figure 38:
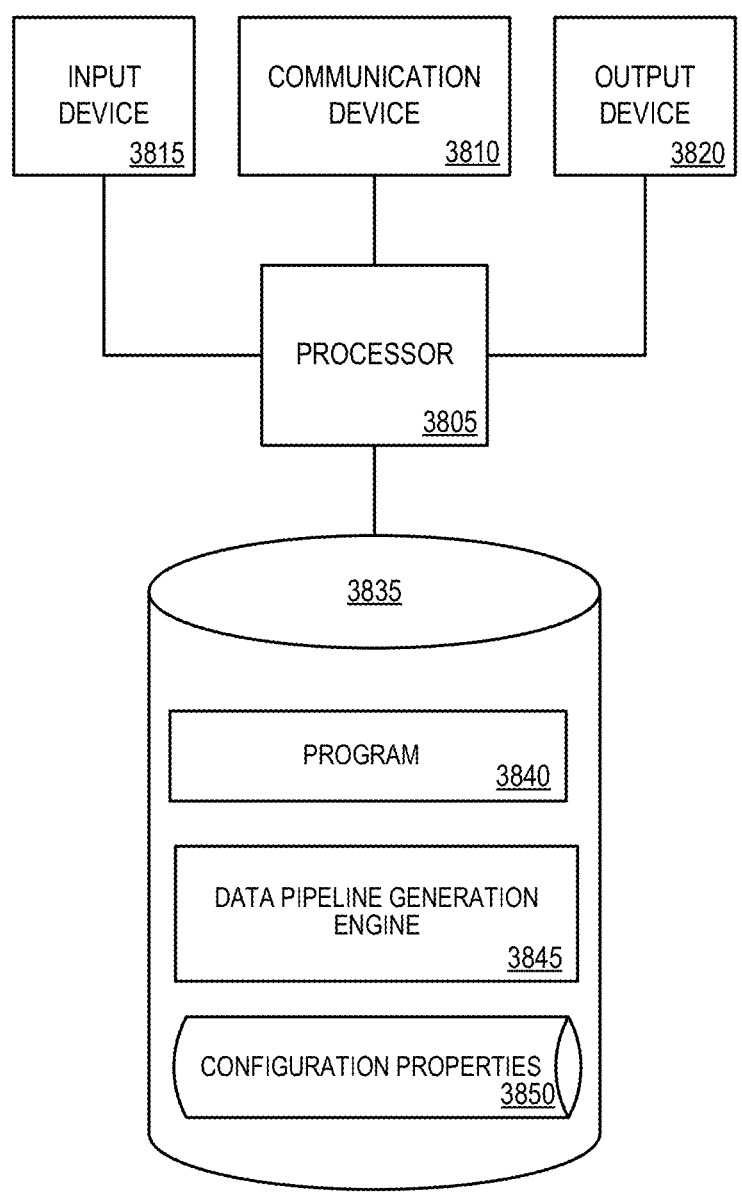
FIG. 38 is an example of a computer system useful for implementing various embodiments.

FIG. 38 is an illustrative block diagram of an apparatus or platform, in accordance with an example embodiment. Note that the embodiments described herein may be implemented using any number of different hardware configurations. For example, FIG. 38 is a block diagram of an apparatus or platform 3800 that may be, for example, associated with an implementation of processes disclosed herein (e.g., process 600, 1000). Platform 3800 comprises a processor 3805, such as one or more commercially available CPUs in the form of one-chip microprocessors, coupled to a communication device 3810 configured to communicate via a communication network (not shown in FIG. 38). Communication device 3810 may be used to communicate, for example, with one or more remote applications or platforms. Apparatus 3800 further includes an input device 3815 (e.g., a computer mouse, a keyboard, etc.) and an output device 3820 (e.g., a computer monitor to render a visualization, create reports, etc.). According to some embodiments, a mobile device, PC, and other devices may be used to exchange data with apparatus 3800.

Processor 3805 also communicates with a storage device 3835. Storage device 3835 can be implemented as a single database or the different components of storage device 3835 can be distributed using multiple databases (that is, different deployment data storage options are possible). Storage device 3835 may comprise any appropriate data storage device, including combinations of magnetic storage devices (e.g., a hard disk drive), optical storage devices, mobile telephones, and semiconductor memory devices to support and facilitate a data plane as disclosed herein. Storage device 3835 stores a program 3840 and data pipeline generation engine 3845 for controlling the processor 3805. Processor 3805 performs instructions of the programs 3840, 3845, and thereby operates in accordance with any of the embodiments described herein. Storage device 3835 further stores configuration properties 3850.

Programs 3840, 3845 may be stored in a compressed, uncompiled, encrypted, and other configured format. Programs 3840, 3845 may furthermore include other program elements, such as an operating system, clipboard application, a database management system, and device drivers used by processor 3805 to interface with peripheral devices.

As used herein, data may be "received" by or "transmitted" to, for example: (i) the platform 3800 from another device; or (ii) a software application or module within the platform 3800 from another software application, module, or any other source.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and any other non-transitory transmitting or receiving medium such as the Internet, cloud storage, the Internet of Things (IoT), or other communication network or link. The article of manufacture containing the computer code may be made and used by executing the code directly from one medium, by copying the code from one medium to another medium, or by transmitting the code over a network.

The computer programs (also referred to as programs, software, software applications, "apps", or code) may include, for example, machine instructions for a programmable processor, and may be implemented in a high-level procedural, object-oriented programming language, assembly/machine language, etc. As used herein, the terms "machine-readable medium" and "computer-readable medium" refer to any computer program product, apparatus, cloud storage, Internet of Things, and device (e.g., magnetic discs, optical disks, memory, programmable logic devices (PLDs)) used to provide machine instructions and data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and any other kind of data to a programmable processor.

In some embodiments, aspects of the present disclosure might be exploited to enable the parallel execution of data pipelines specified in a data integration, management, and processing platform. In some aspects, one or more features of the present disclosure might be implemented in a data processing system and platform at multiple levels. For example, when the multiplicity of a group is explicitly defined, the specification of the divide-and-conquer configuration properties described in the present disclosure might be used to provide a mechanism for the parallel execution of groups that can only be executed without any parallelism using conventional systems. Furthermore, the present disclosure provides methods and systems that provide clear guidelines for a developer to characterize groups that can be executed in parallel or not, whereas no such indication is provided previous (i.e., conventional) system. In some aspects, once the divide-and-conquer configuration properties of a group are defined, the decision of how many replicas to create for a group can be determined at a runtime according to the event workload, which results in a more scalable approach than having to determine in advance how many replicas must be created. These and other benefits and advantages may be provided by some embodiments of the present disclosure.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computer-implemented method, the method comprising:
   receiving, as an input, configuration properties of a group of operators of a data pipeline, the data pipeline including a specified multiplicity greater than 1;
   generating, as an output, a configuration for two new operators, including a first new operator that transforms a dataset output of a preceding operator according to the configuration properties of the group of operators of the data pipeline and dispatches the transformed dataset to the replicas of the group of operators of the data pipeline and a second new operator that collects results of the replicas of the group of operators of the data pipeline and computes, based on the configuration properties of the group of operators of the data pipeline and an order preserving requirement, a result dataset that it provides to a succeeding operator; and
   automatically inserting the first new operator and the second new operator into a deployment of the data pipeline, the first new operator being inserted before a number of replicas of the group of operators of the data pipeline corresponding to the specified multiplicity and the second new operator being inserted after the number of replicas of the group of operators of the data pipeline corresponding to the specified multiplicity.

2. The method of claim 1, wherein the configuration properties specify properties defining a parallel computation of an execution of the group of operators of the data pipeline.

3. The method of claim 2, wherein the configuration properties comprise:
characteristics of a restructure configuration of an input dataset into another dataset;
characteristics of a transduction configuration of an input dataset with respect to an incremental state; and
characteristics of an aggregation configuration of results obtained for each element of the input dataset.

4. The method of claim 1, further comprising receiving a predefined indication of a value for at least one of the configuration properties.

5. The method of claim 1, further comprising executing of the group of operators of the deployed data pipeline having the first new operator and the second new operator inserted therein, wherein the group of operators are executed in parallel.

6. The method of claim 1, wherein an execution of the group of operators of the deployed data pipeline having the first new operator and the second new operator inserted therein generates a result equivalent to a result generated using a deployment of the data pipeline without any replicas of the group of operators of the data pipeline.

7. A system comprising:
a memory storing processor-executable program code; and
a processing unit to execute the processor-executable program code to cause the system to:
receive, as an input, configuration properties of a group of operators of a data pipeline, the data pipeline including a specified multiplicity greater than 1;
generate, as an output, a configuration for two new operators, including a first new operator that transforms a dataset output of a preceding operator according to the configuration properties of the group of operators of the data pipeline and dispatches the transformed dataset to the replicas of the group of operators of the data pipeline and a second new operator that collects results of the replicas of the group of operators of the data pipeline and computes, based on the configuration properties of the group of operators of the data pipeline and an order preserving requirement, a result dataset that it provides to a succeeding operator, and
automatically insert the first new operator and the second new operator into a deployment of the data pipeline, the first new operator being inserted before a number of replicas of the group of operators of the data pipeline corresponding to the specified multiplicity and the second new operator being inserted after the number of replicas of the group of operators of the data pipeline corresponding to the specified multiplicity.

8. The system of claim 7, wherein the configuration properties specify properties defining a parallel computation of an execution of the group of operators of the data pipeline.

9. The system of claim 8, wherein the configuration properties comprise:
characteristics of a restructure configuration mapping of an input dataset into another dataset;
characteristics of a transduction configuration mapping of an input dataset with respect to an incremental state; and
characteristics of an aggregation configuration mapping of results obtained for each element of the input dataset.

10. The system of claim 7, further comprising receiving a predefined indication of a value for at least one of the configuration properties.

11. The system of claim 7, further comprising executing of the group of operators of the deployed data pipeline having the first new operator and the second new operator inserted therein, wherein the group of operators are executed in parallel.

12. The system of claim 7, wherein an execution of the group of operators of the deployed data pipeline having the first new operator and the second new operator inserted therein generates a result equivalent to a result generated using a deployment of the data pipeline without any replicas of the group of operators of the data pipeline.

13. A non-transitory, computer-readable medium storing program code, the program code executable by a computer processor to cause the processor to perform a method comprising:
receiving, as an input, configuration properties of a group of operators of a data pipeline, the data pipeline including a specified multiplicity greater than 1;
generating, as an output, a configuration for two new operators, including a first new operator that transforms a dataset output of a preceding operator according to the configuration properties of the group of operators of the data pipeline and dispatches the transformed dataset to the replicas of the group of operators of the data pipeline and a second new operator that collects results of the replicas of the group of operators of the data pipeline and computes, based on the configuration properties of the group of operators of the data pipeline and an order preserving requirement, a result dataset that it provides to a succeeding operator; and
automatically inserting the first new operator and the second new operator into a deployment of the data pipeline, the first new operator being inserted before a number of replicas of the group of operators of the data pipeline corresponding to the specified multiplicity and the second new operator being inserted after the number of replicas of the group of operators of the data pipeline corresponding to the specified multiplicity.

14. The medium of claim 13, wherein the configuration properties specify properties defining a parallel computation of an execution of the group of operators of the data pipeline.

15. The medium of claim 14, wherein the configuration properties comprise:
characteristics of a restructure configuration of an input dataset into another dataset;
characteristics of a transduction configuration of an input dataset with respect to an incremental state; and
characteristics of an aggregation configuration of results obtained for each element of the input dataset.

16. The medium of claim 13, further comprising receiving a predefined indication of a value for at least one of the configuration properties.

17. The medium of claim 13, further comprising executing of the group of operators of the deployed data pipeline having the first new operator and the second new operator inserted therein, wherein the group of operators are executed in parallel.

* * * * *